(12) United States Patent
Chiba

(10) Patent No.: US 11,566,704 B2
(45) Date of Patent: Jan. 31, 2023

(54) SHIFT SELECTOR DEVICE

(71) Applicant: DENSO CORPORATION, Kariya (JP)

(72) Inventor: Kunihiko Chiba, Kariya (JP)

(73) Assignee: DENSO CORPORATION, Kariya (JP)

( * ) Notice: Subject to any disclaimer, the term of this patent is extended or adjusted under 35 U.S.C. 154(b) by 915 days.

(21) Appl. No.: 16/427,386

(22) Filed: May 31, 2019

(65) Prior Publication Data

US 2019/0285173 A1 Sep. 19, 2019

Related U.S. Application Data

(63) Continuation of application No. PCT/JP2017/040514, filed on Nov. 10, 2017.

(30) Foreign Application Priority Data

Dec. 7, 2016 (JP) .............................. JP2016-237836

(51) Int. Cl.

| | |
|---|---|
| *F16H 61/28* | (2006.01) |
| *B60W 30/00* | (2006.01) |
| *B60W 50/08* | (2020.01) |
| *B60K 20/02* | (2006.01) |
| *B60K 20/00* | (2006.01) |

(Continued)

(52) U.S. Cl.
CPC ......... *F16H 61/2807* (2013.01); *B60K 20/00* (2013.01); *B60K 20/02* (2013.01); *B60K 35/00* (2013.01); *B60K 37/06* (2013.01); *B60W 30/00* (2013.01); *B60W 50/08* (2013.01); *F16H 59/10* (2013.01); *F16H 61/02* (2013.01);

(Continued)

(58) Field of Classification Search
CPC ...... F16H 61/2807; F16H 61/02; F16H 59/10; F16H 63/50; B60K 20/00; B60K 20/02; B60K 35/00; B60K 37/06; B60K 2370/175; B60W 30/00; B60W 50/08; B60W 50/082; G05D 1/00
See application file for complete search history.

(56) References Cited

U.S. PATENT DOCUMENTS 9,821,817 B2 * 11/2017 Desnoyer .............. B60W 50/14
10,222,796 B2 * 3/2019 Ichikawa ............. G05D 1/0088
(Continued)

FOREIGN PATENT DOCUMENTS

| CN | 104973063 A | 10/2015 |
|---|---|---|
| DE | 102014226014 A1 | 6/2016 |

(Continued)

*Primary Examiner* — Tisha D Lewis
(74) *Attorney, Agent, or Firm* — Harness, Dickey & Pierce, P.L.C.

(57) ABSTRACT

A shift selector device includes an input member, a position setting mechanism and an activation controller. A selection operation of selecting a shift position is input to the input member. The position setting mechanism defines a movable range of the input member while supporting the input member in a displaceable manner. A plurality of the shift positions and at least one activation position linked to an automated travel system are disposed in the movable range. When the activation position is selected by displacement of the input member, the activation controller outputs an activation instruction for instructing a control function of the automated travel system linked to the activation position to be activated.

8 Claims, 15 Drawing Sheets

(51) Int. Cl.
  *B60K 37/06* (2006.01)
  *F16H 59/10* (2006.01)
  *F16H 61/02* (2006.01)
  *F16H 63/50* (2006.01)
  *B60K 35/00* (2006.01)

(52) U.S. Cl.
  CPC ........ *F16H 63/50* (2013.01); *B60K 2370/175* (2019.05); *B60W 50/082* (2013.01)

(56) References Cited

U.S. PATENT DOCUMENTS

2015/0283998 A1  10/2015  Lind et al.
2018/0208211 A1   7/2018  Chiba

FOREIGN PATENT DOCUMENTS

| DE | 102012002303 B4 * | 7/2017 | ............. B60K 26/02 |
| JP | 2008201210 A | 9/2008 | |
| JP | 2011152826 A | 8/2011 | |
| JP | 2017024521 A | 2/2017 | |
| WO | WO-2013117309 A1 * | 8/2013 | ............. B60K 37/06 |
| WO | WO-2015024708 A1 | 2/2015 | |

* cited by examiner

SHIFT SELECTOR DEVICE

CROSS REFERENCE TO RELATED APPLICATIONS

The present application is a continuation application of International Patent Application No. PCT/JP2017/040514 filed on Nov. 10, 2017, which designated the U.S. and claims the benefit of priority from Japanese Patent Application No. 2016-237836 filed on Dec. 7, 2016. The entire disclosures of all of the above applications are incorporated herein by reference.

TECHNICAL FIELD

The present disclosure relates to a shift selector device.

BACKGROUND

A selector device for selecting a shift position of a transmission or the like is mounted on a vehicle.

SUMMARY

The present disclosure provides a shift selector device including an input member, a position setting mechanism and an activation controller. A selection operation of selecting a shift position is input to the input member. The position setting mechanism defines a movable range of the input member while supporting the input member in a displaceable manner. A plurality of the shift positions and at least one activation position linked to an automated travel system are disposed in the movable range. When the activation position is selected by displacement of the input member, the activation controller outputs an activation instruction for instructing a control function of the automated travel system linked to the activation position to be activated.

BRIEF DESCRIPTION OF THE DRAWINGS

The above and other objects, features and advantages of the present disclosure will become more apparent from the following detailed description made with reference to the accompanying drawings, in which.

DETAILED DESCRIPTION

Figure 1:
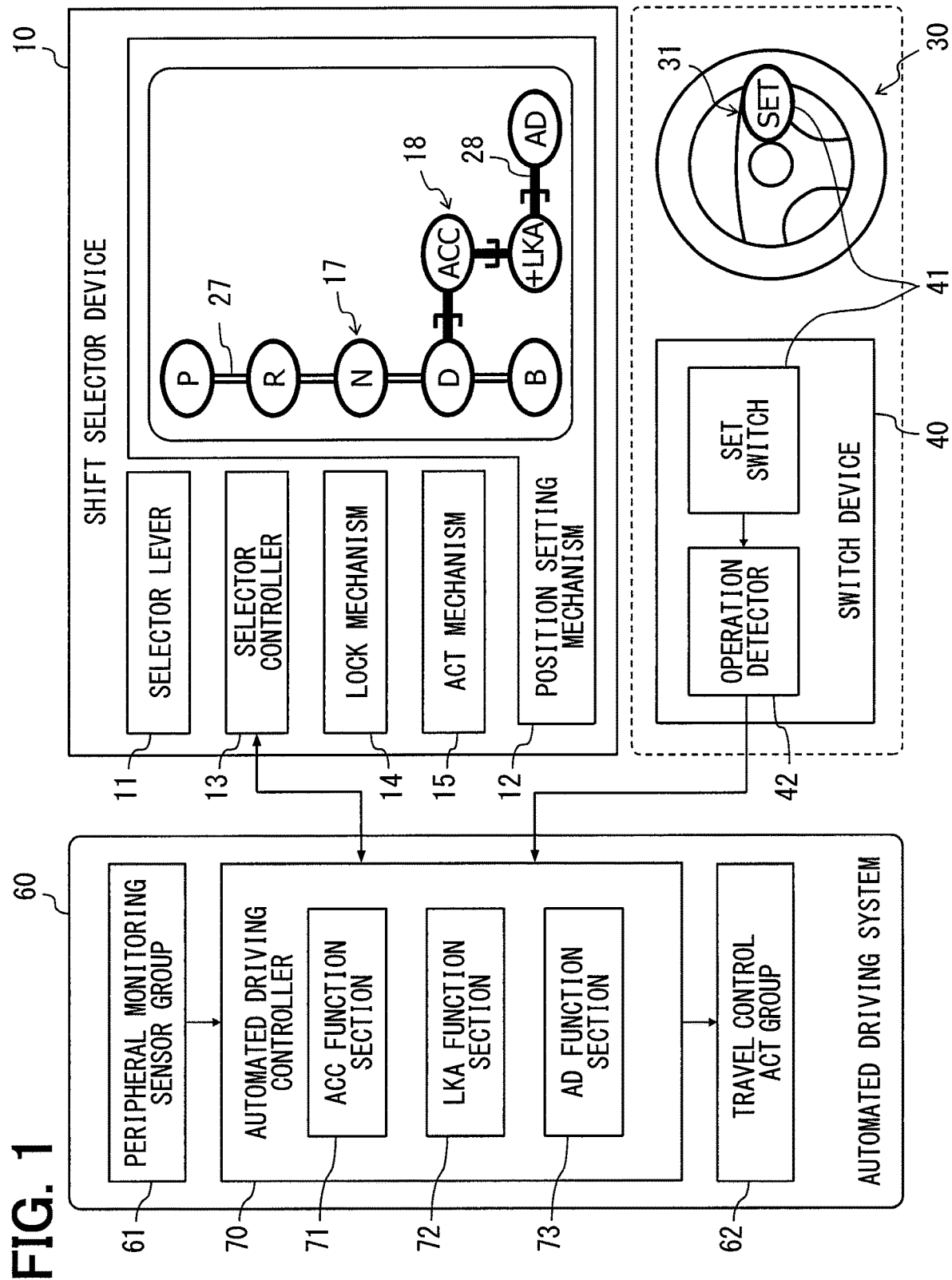
FIG. 1 is a block diagram illustrating an electrical configuration of a shift selector device, a switch device, and an automated driving system according to a first embodiment.

For example, as one type of a selector device, a parking assist dedicated range "Pauto" for allowing a parking assist system to perform parking assistance may be added to common shift positions in an operation device. A driver can use the parking assist system by performing an operation input to a shift lever to select the parking assist dedicated range.

However, only the activation of a parking assist system is assumed in some operation devices. In recent years, not only the parking assist system but also an automated travel system that achieves automated driving of a vehicle on a road instead of a driver is being mounted on a vehicle. An operation lever for activating functions of the automated travel system is usually formed to be projected from a steering column or the like. Such an operation lever may lead to the complicated structure around a steering wheel.

Hereinafter, a plurality of embodiments of the present disclosure will be described with reference to the drawings. Like constituent elements are given like reference numerals in the respective embodiments, and thus overlapping descriptions may be omitted. When configurations are described only partly in the respective embodiments, the configurations of the embodiments previously described may be applied to the rest of the configurations.

Further, not only a combination of the configurations specified in the respective embodiments but also a combination of configurations of the embodiments that are not specified is possible as long as the combination does not cause any problem. Note that unspecified combinations of the configurations described in the embodiments and modifications are also disclosed by the following description.

First Embodiment

A shift selector device 10 according to a first embodiment of the present disclosure is an operation device that is installed in a center console between a driver seat and a passenger seat or in a center portion of an instrumental panel. The shift selector device 10, a switch device 40, and the like are mounted on a vehicle including an automated driving system 60. In addition to a normal selection operation (hereinafter "shift operation") of selecting a shift position, a shift operation of selecting a control function of the automated driving system 60 is input to the shift selector device 10 used for a vehicle having the automated driving system 60 incorporated therein.

The automated driving system 60 enables automated travel of a vehicle along a road instead of a driver. The automated driving system 60 includes a plurality of control functions for the purpose of achieving automated travel of a vehicle. The automated driving system 60 is constituted by a peripheral monitoring sensor group 61, a travel control actuator group 62, an automated driving controller 70, and the like.

The peripheral monitoring sensor group 61 includes a plurality of sensor units with different systems such as a camera unit, a rider unit, and a milliwave radar unit. The peripheral monitoring sensor group 61 detects mobile objects such as pedestrians and other vehicles around a host vehicle at least in a traveling direction of the host vehicle and immobile objects such as fallen objects on a road, traffic lights, guard rails, curbs, traffic signs, traffic indications, and lane lines. The peripheral monitoring sensor group 61 sequentially outputs detected object information related to a mobile object and an immobile object detected by each sensor unit to the automated driving controller 70.

The travel control actuator group 62 includes, for example, a throttle actuator of an electronic control throttle, an injector, a brake actuator, drive and regenerative motor generators, and a steering actuator. The travel control actuator group 62 adjusts drive force, braking force, steering force, and the like acting on a vehicle based on control signals acquired from the automated driving controller 70. The travel control actuator group 62 assists or performs a driving operation of a driver instead of the driver to control a vehicle behavior.

The automated driving controller 70 is electrically connected directly or indirectly to the sensor units of the peripheral monitoring sensor group 61 and the configurations of the travel control actuator group 62. The automated driving controller 70 generates a control signal for automated travel of a vehicle based on detected object information acquired from the peripheral monitoring sensor group 61, and outputs the control signal to the travel control actuator group 62. The automated driving controller 70 is mainly constituted by a computer including one or more processors, a RAM, a storage medium, and an input/output interface. The automated driving controller 70 causes a processor to execute an automated travel program stored in the storage medium, thus building functional blocks including an ACC function section 71, an LKA function section 72, and an AD function section 73.

The ACC function section 71 is one of control functions and achieves an ACC (Adaptive Cruise Control) function of controlling a traveling speed of a vehicle. When a vehicle traveling ahead is detected by the peripheral monitoring sensor group 61, based on detected object information related to the vehicle traveling ahead, the ACC function section 71 controls drive force and braking force in cooperation with the travel control actuator group 62 to cause a host vehicle to follow the vehicle traveling ahead. On the other hand, when the vehicle traveling ahead is not detected, the ACC function section 71 controls drive force and braking force to cause the host vehicle to cruise at a constant speed that is a set target speed.

The LKA function section 72 is one of the control functions and achieves an LKA (Lane Keeping Assist) function of adjusting steering force to control a steering angle of a steering wheel. Based on detected object information related to both lane lines for defining a lane, the LKA function section 72 controls the steering angle of the steering wheel in cooperation with the travel control actuator group 62 to cause a vehicle to travel along the lane. The LKA function performed by the LKA function section 72 is activated as "ACC+LKA function" only when the ACC function is activated.

The AD function section 73 is one of the control functions, executes overall control including acceleration/deceleration and steering, and achieves a limited automated drive (Auto Drive, hereinafter "AD") function that eliminates driver's peripheral monitoring. During the AD function, a driver has to appropriately respond to a request to change the driver from the automated driving system 60. The AD function section 73 determines a vehicle travel plan based on detected object information acquired from the peripheral monitoring sensor group 61. The AD function section 73 controls drive force, braking force, and steering force in cooperation with the travel control actuator group 62 to cause a vehicle to travel based on the travel plan determined.

The automated driving controller 70 can activate the function sections 71 to 73 based on an activation instructing signal acquired from the shift selector device 10. When activated, the function sections 71 to 73 start to acquire detected object information from the peripheral monitoring sensor group 61 and can control the travel control actuator group 62. In other words, in an activated state, the control functions of the function sections 71 to 73 do not control a vehicle behavior. Based on an operation instructing signal acquired from the switch device 40, the automated driving controller 70 starts to control the vehicle behavior in cooperation with the function sections 71 to 73 and the travel control actuator group 62.

The automated driving controller 70 monitors whether the function sections 71 to 73 can operate based on information acquired from the peripheral monitoring sensor group 61. If there are unavailable control functions due to an abnormality of the peripheral monitoring sensor group 61 and the climate and road environment around a vehicle, the automated driving controller 70 outputs a function state signal indicating whether each control function is available to the shift selector device 10.

The control functions described above include an upper control function in which many types of driving operations are control targets or a driver is required to do less tasks during traveling and a lower control function in which less types of driving operations are control targets or a driver is required to do many tasks during traveling. The ACC function is a lower control function of the ACC+LKA function and the AD function. The AD function is an upper control function of the ACC function and the ACC+LKA function. Similarly, the ACC+LKA function is an upper control function of the ACC function and a lower control function of the AD function. That is, the level of the control function increases in the order of the ACC function, the ACC+LKA function, and the AD function. In general, as the level of the control function increases, such control function is available only in a limited number of cases.

The switch device 40 is electrically connected directly or indirectly to the automated driving controller 70. The switch device 40 is disposed at a position different from that of a selector lever 11 in the shift selector device 10, specifically, in a spoke 31 of a steering wheel 30. The switch device 40 includes a set switch 41 and an operation detector 42. A press operation for instructing the function sections 71 to 73 in an activated state to start operating is input to the set switch 41 by a driver. When detecting the input of the press operation to the set switch 41, the operation detector 42 outputs an operation instructing signal for instructing an activating control function to start operating to the automated driving controller 70.

The shift selector device 10 is electrically connected directly or indirectly to the automated driving controller 70. The shift selector device 10 acquires a function state signal from the automated driving controller 70 and outputs an activation instructing signal to the automated driving controller 70. The shift selector device 10 includes the selector lever 11, a position setting mechanism 12, a lock mechanism 14, an actuator mechanism 15, and a selector controller 13.

The selector lever 11 is an input member to which a shift operation of alternatively selecting a shift position 17 is input by a driver. The selector lever 11 is made of, for example, a metal material in a bar shape, and projects upward from a center console. A grip or the like for allowing a driver to grip is formed at the distal end of the selector lever 11 in a projecting direction thereof.

The position setting mechanism 12 supports the selector lever 11 in a displaceable manner. The position setting mechanism 12 defines a movable range of the selector lever 11. The position setting mechanism 12 is embedded in a center console, for example. A plurality of shift positions 17 and a plurality of activation positions 18 are set in the movable range of the selector lever 11 defined by the position setting mechanism 12.

The shift positions 17 are respectively linked to operating states of an automatic transmission or a drive system mounted on a vehicle. The shift positions 17 are arranged on a shift line 27 (see a double line in FIG. 1) formed in a straight line, for example, at intervals. The shift line 27 on which the shift positions 17 are arranged is set along a vehicle longitudinal direction, for example. The selector lever 11 is displaceable along the shift line 27. Examples of the shift positions 17 include a P (parking) range, an R (reverse) range, an N (neutral) range, a D (drive) range, and a B (brake) range.

The activation positions 18 are respectively linked to the control functions of achieving automated travel in the automated driving system 60. The activation positions 18 are arranged on an activation line 28 (see a thick solid line in FIG. 1) at intervals. The activation line 28 is bent like a crank and extends along a vehicle transverse direction to a driver's seat side. The activation positions 18 are disposed at two bent portions and an end portion of the activation line 28. The activation line 28 branches from the shift line 27 at the D range, which is one of the shift positions 17. The selector lever 11 can move from the shift line 27 to the activation line 28 at the D range, and can be displaced along the activation line 28 in a zig-zag manner.

On the activation line 28 described above, an activation position 18 linked to the upper control function is disposed at a position further from the D range than another activation position 18 linked to the lower control function. Specifically, the ACC range, which is the activation position 18 linked to the ACC function, is disposed at a position closest to the D range. The +LKA range linked to the ACC+LKA function is disposed at a position behind the ACC range, which is the second closest to the D range. The AD range linked to the AD function is disposed at a position on a side of the +LKA range, which is the furthest from the D range.

The lock mechanism 14 is disposed between the activation positions 18 on the activation line 28. The lock mechanism 14 can alternatively switch between a released state where displacement of the selector lever 11 from one activation position 18 to another activation position 18 is allowed and a restricted state where such displacement is physically prohibited. When the upper control function is not available in the automated driving system 60, based on control of the selector controller 13, the lock mechanism 14 restricts displacement of the selector lever 11 to an activation position linked to the upper control function that is unavailable. Consequently, it is impossible to perform a shift operation of the selector lever 11 from a lower activation position 18 to an upper activation position 18.

The actuator mechanism 15 applies operating force to the selector lever 11 on the activation line 28 based on control of the selector controller 13. The actuator mechanism 15 applies operating force to the selector lever 11 to move the selector lever 11 to the D range along the activation line 28. When an operating control function stops or is going to stop, the actuator mechanism 15 forcibly moves the selector lever 11 from the activation position 18 linked to the control function to the activation position 18 linked to a lower control function.

The selector controller 13 includes a detection circuit and a communication circuit. The detection circuit detects the shift position 17 or the activation position 18 selected by the selector lever 11. The communication circuit is a configuration of transmitting and receiving information to and from the automated driving controller 70, and performs a process of acquiring a function state signal and a process of outputting an activation instructing signal. When one activation position 18 is selected, the selector controller 13 outputs an activation instructing signal for instructing the control function linked to the activation position 18 selected to be activated to the automated driving controller 70.

The activation instructing signal may be a signal simply indicating the activation position 18 alternatively selected by the selector lever 11, for example. The automated driving controller 70 having acquired such an activation instructing signal connects the activation instructing signal to any of the control functions and activates an automated travel function linked to the activation position 18 being selected, which is one of the ACC function, the ACC+LKA function, and the AD function.

The activation instructing signal may be a command containing information for specifying a control function to be activated among the control functions and a command to instruct the control function to be activated. In this case, the automated driving controller 70 activates the control function specified by the activation instructing signal.

The selector controller 13 controls the lock mechanism 14 and the actuator mechanism 15 based on a function state signal acquired from the automated driving controller 70. Specifically, when a certain upper control function is not available, the movement between the activation position 18 linked to the upper control function and the activation position 18 linked to an available control function is restricted by the lock mechanism 14. For example, when there are no lane lines and thus the ACC+LKA function is not available, the movement of the selector lever 11 from the ACC range to the +LKA range is prohibited by the lock mechanism 14.

When an upper control function operating in the automated driving system 60 stops or is going to stop based on a function state signal, the selector controller 13 moves the selector lever 11 to a lower activation position 18 according to the stoppage of operation of the upper control function. Based on control of the actuator mechanism 15, the selector controller 13 shifts-down the selector lever 11 to the activation position 18 linked to an operable lower control function indicated by the function state signal. The selector controller 13 restricts the shift-up of the selector lever 11 to an upper position by the lock mechanism 14. For example, when an area where the AD function is available almost ends and the AD function is going to stop, the automated driving system 60 stops the AD function and the actuator mechanism 15 performs a shift-down operation from the AD range to the +LKA range.

Figure 2:
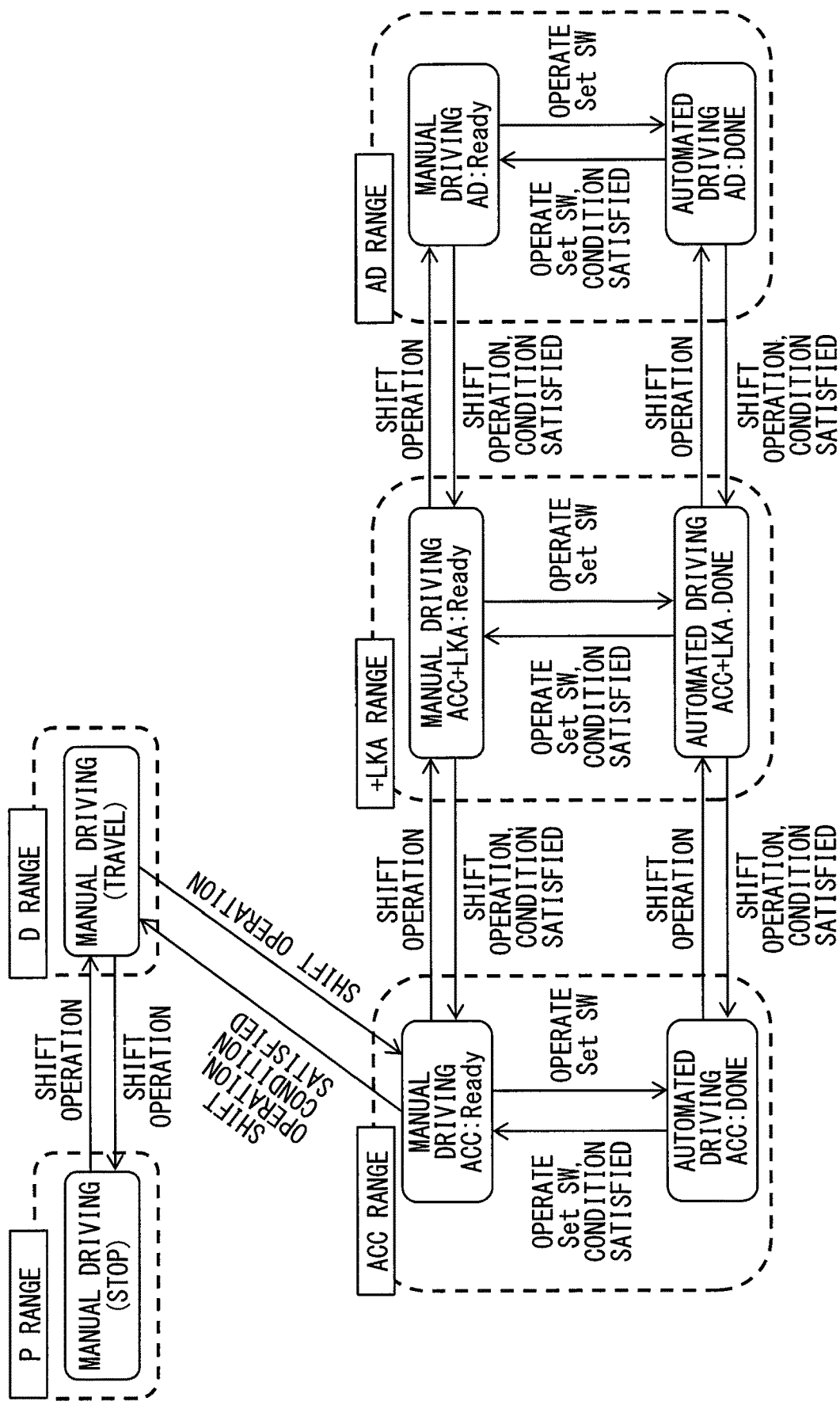
FIG. 2 is a state transition diagram illustrating a state transition of a control function performed by a shift operation of the shift selector device.

Next, a method of activating and operating control functions of the automated driving system 60 by inputting a shift operation to the shift selector device 10 described above will be described in detail with reference to a state transition diagram of FIG. 2 as well as FIG. 1.

When the selector lever 11 is in the P range or the D range, the automated driving system 60 does not substantially interfere with control of a vehicle behavior. When the P range is selected, a vehicle is in a manual driving mode and stops. The selector lever 11 can move between the P range and the D range by a normal shift operation. When the D range is selected, the vehicle travels according to a driving operation by a driver.

When the selector lever 11 is moved from the D range to the ACC range and the ACC range is selected, the ACC function of the ACC function section 71 is activated to be in a ready state. The ACC function in a ready state does not perform acceleration/deceleration control. The vehicle thus continues to travel in the manual driving mode. When the ACC function is in a ready state and then an operation is input to the set switch 41, the ACC function becomes an operating state and performs automated driving on the acceleration/deceleration control.

When an operation is input again to the set switch 41 during automated driving using the ACC function, the ACC function cancels its operation and returns to a ready state. Similarly, when a predetermined condition for transition to a ready state is satisfied, the ACC function suspends its operation and returns to a ready state. Examples of the condition for transition to the ready state of the ACC function include inputs of an accelerator operation and a brake operation by the driver. The manual driving by the driver starts again in the cases described above.

When a shift operation from the ACC range to the D range is performed, the ACC function stops. When a condition for transition from the ACC range to the D range is satisfied, the ACC function stops and the selector lever 11 is moved to the D range. Examples of the condition for transition from the ACC range to the D range include an abnormality of the peripheral monitoring sensor group 61. The manual driving by the driver also starts again in this case.

When the selector lever 11 is moved from the ACC range to the +LKA range and the +LKA range is selected, the LKA function of the LKA function section 72 is activated with the ACC function. When the ACC function is already in an operating state during such a shift operation, the LKA function is also activated to be in an operating state. Automated driving is thus performed on the acceleration/deceleration control and steering control.

On the other hand, when the +LKA range is selected while the ACC function is in a ready state, the ACC function and the LKA function are in a ready state. When an operation is input to the set switch 41, the ACC+LKA function becomes in an operating state. Automated driving is thus performed on the acceleration/deceleration control and steering control.

When an operation is input again to the set switch 41 during automated driving using the ACC+LKA function, two functions cancel their operations and return to be in a ready state. Similarly, when a condition for transition to the ready state of the ACC+LKA function is satisfied, for example, when a brake is operated by the driver, the ACC+LKA function also suspends its operation and returns to be in a ready state. The manual driving by the driver thus starts again.

When a condition for transition to the ready state of the LKA function is satisfied, for example, when a steering operation is input to the steering wheel 30 or the driver lets go of the steering wheel 30, only the LKA function of the two functions returns to be in a ready state. In the above cases, only acceleration/deceleration control by the ACC function continues. The steering control by the LKA function may restart when an operation is input again to the set switch 41 or when the time elapses, for example.

When a shift operation from the +LKA range to the ACC range is performed, the LKA function stops. In this case, when at least the ACC function is in an operating state, the acceleration/deceleration control by the ACC function continues. When a condition for transition from the +LKA range to the ACC range is satisfied, the LKA function stops and the selector lever 11 is moved to the ACC range. As an example, when a failure occurs in a function of recognizing a lane line in the peripheral monitoring sensor group 61, the condition for transition from the +LKA range to the ACC range is satisfied. Also in this case, when the ACC+LKA function is already in an operating state before the transition condition is satisfied, the LKA function stops but the acceleration/deceleration control by the ACC function continues.

When the selector lever 11 is moved from the +LKA range to the AD range and the AD range is selected, the AD function of the AD function section 73 is activated. When the ACC function or the ACC+LKA function is already in an operating state during such a shift operation, the AD function is also activated to be in an operating state. Consequently, a travel plan is determined, the acceleration/deceleration control and the steering control start based on the travel plan, and automated driving is performed based on the travel plan.

On the other hand, when the AD range is selected while the ACC function or the ACC+LKA function is in a ready state, the AD function also becomes in a ready state. When an operation is input to the set switch 41, the AD function becomes in an operating state. Automated driving is thus performed based on the travel plan.

When an operation is input again to the set switch 41 during automated travel using the AD function, the AD function cancels its operation and returns to be in a ready state. Similarly, when a condition for transition to the ready state of the AD function is satisfied, for example, when a driving operation is input by the driver, the AD function also suspends its operation and returns to be in a ready state. The manual driving by the driver thus starts again.

When a shift operation from the AD range to the +LKA range is performed, the AD function stops. In this case, when the AD function is in an operating state, automated travel using the ACC+LKA function continues. When a condition for transition from the AD range to the +LKA range is satisfied, the AD function stops and the selector lever 11 is moved to the +LKA range. For example, when the area where the AD function is available ends, the condition for transition from the AD range to the +LKA range is satisfied.

After the AD function stops, the automated driving using the ACC+LKA function may continue, or the vehicle driving mode may be switched to the manual driving mode.

In the first embodiment described above, when the activation position 18 set in the position setting mechanism 12 is selected, the control function of the automated driving system 60 is activated by an output of an activation instruction in response to a shift operation. As described above, when the activation positions 18 are disposed in the movable range of the selector lever 11, a driver can perform a shift operation on the shift selector device 10 to activate the function of the automated driving system 60. It is thus possible to eliminate a configuration for activating the function of the automated driving system 60 such as an operation lever.

In addition, selection of, for example, the ACC range can be checked by the position of the selector lever 11 in the first embodiment. A driver can thus recognize which control function including the ACC function is activated without checking a display or the like. Consequently, when a driver drives a vehicle that is unfamiliar to the driver or is difficult to visually recognize a display because of external light or the like, the driver does not take time to check the display and does not have to repeat unnecessary operations in order to find the display.

In the first embodiment, the ranges of the activation positions 18 respectively allocated to the control functions are arranged. For this reason, when pressing the set switch 41, a driver can easily and quickly understand which control function operates and which control function does not operate at that moment. Consequently, when pressing the set switch 41, the driver hardly worries about whether the ACC function or the LKA function operates or whether both the functions operate.

In addition, in the first embodiment, since the automated driving system 60 can operate a plurality of control functions, the position setting mechanism 12 includes a plurality of activation positions 18 respectively linked to the control functions including the ACC function, the LKA function, and the AD function. With such a configuration, even if the automated driving system 60 includes a plurality of control functions, a driver can appropriately select a control function by a shift operation and activate the control function selected.

In the first embodiment, the activation position 18 linked to an upper control function is disposed at a position further from the D range than the activation position 18 linked to a lower control function. A driver can thus activate the control functions in a stepwise manner from the lower control function to the upper control function along the activation line 28 by moving the selector lever 11 while setting the D range as a starting point.

Moreover, in the first embodiment, when there is an unavailable control function, the movement of the selector lever 11 to the activation position 18 corresponding to that control function is restricted by the lock mechanism 14. Consequently, when a driver inputs an operation to the selector lever 11, the driver can understand that a certain control function is not available because of the movement restriction by the lock mechanism 14. The shift selector device 10 can clearly inform the driver which of the control functions in the automated driving system 60 is available.

In addition, in the first embodiment, the actuator mechanism 15 automatically moves the selector lever 11 to a control function that is operable in the automated driving system 60. According to such an operation of the actuator mechanism 15, the shift selector device 10 can clearly inform a driver which of the control functions in the automated driving system 60 is available or unavailable.

Moreover, in the first embodiment, the control function activated by selecting the activation position 18 starts its operation based on an input of an operation to the set switch 41. As described above, if the operation of the automated driving system 60 starts by operating the selector lever 11 and the set switch 41 at different locations, it is possible to prevent the automated driving system 60 from starting its operation by an erroneous operation. In addition, when the set switch 41 is disposed on the steering wheel 30, a driver can perform a control function while checking the surrounding situation of a vehicle.

In the first embodiment, the selector lever 11 corresponds to "input member", the selector controller 13 corresponds to "activation controller", the lock mechanism 14 corresponds to "restriction unit", and the automated driving system 60 corresponds to "automated travel system".

Second Embodiment

A second embodiment of the present disclosure illustrated in FIGS. 3 to 6 is a modification of the first embodiment. A shift selector device 210 according to the second embodiment can switch control functions of an automated driving controller 270 based on automated levels of automated driving, unlike the shift selector device according to the first embodiment. The automated levels are based on standards determined by National Highway Traffic Safety Administration (NHTSA), for example. The automated levels based on the standards of NHTSA include automated level 0 that is a manual driving mode and automated levels 1 to 4 at which the automated driving system 60 operates. As the automated level becomes higher, the number of types of driving operations to be controlled increases or the number of tasks of a driver during traveling decreases. That is, a control function with a higher automated level is an upper control function of the automated driving system 60.

Specifically, automated level 1 is a level at which the automated driving system 60 performs any of acceleration, steering, and braking. Automated level 2 is a level at which the system performs some of acceleration, steering, and braking. At automated levels 1 and 2, a driver is responsible for driving. In addition, at automated level 2, the driver must monitor surrounding situations while the automated driving system 60 performs a driving operation.

Automated level 3 is a level at which the automated driving system 60 performs all the acceleration, steering, and braking and a driver responds to requests from the automated driving system 60. During automated traveling at automated level 3, the automated driving system 60 is responsible for driving and the driver does not have to monitor surrounding situations. Automated level 4 is a level at which systems other than a driver perform all the acceleration, steering, and braking and the driver is not engaged in driving. At automated level 4, the automated driving system 60 is responsible for driving in all driving courses.

The automated driving controller 270 includes a control function for automated parking of a vehicle in a parking space, in addition to the control functions for automated travel of a vehicle at the automated levels described above. The automated driving controller 270 causes a processor to execute an automated driving program, thus building a level switching section 271, an automated travel function section 272, and an automated parking function section 273 instead of the function sections 71 to 73 of the first embodiment (see FIG. 1).

The level switching section 271 sets an automated level during automated traveling to any of levels 2 to 4, based on an activation instructing signal acquired from the shift selector device 210. The level switching section 271 monitors whether automated driving at each automated level is available based on information acquired from the peripheral monitoring sensor group 61. The level switching section 271 generates a function state signal indicating whether the control function at each automated level is available and outputs the function state signal to the shift selector device 210.

The automated travel function section 272 controls drive force, braking force, and steering force in cooperation with the travel control actuator group 62 to achieve automated travel at an automated level set by the level switching section 271. At automated level 2, for example, the automated travel function section 272 executes substantially the same control as the ACC+LKA function in the first embodiment. At automated level 3, the automated travel function section 272 executes substantially the same control as the AD function in the first embodiment.

At automated level 4, the automated travel function section 272 executes vehicle control substantially identical to the AD function in every road environment. As a result, the automated travel function section 272 can perform completely automated driving in which passengers including a driver arrive at a destination input by the driver or the passengers without requiring any driving operation by the driver.

Based on an activation instructing signal acquired from the shift selector device 210, the automated driving controller 270 activates a control function of automated travel at a certain automated level and starts to acquire detected object information necessary for automated travel at each automated level. The automated driving controller 270 thus becomes in a ready state where automated travel can start. Based on an operation instructing signal acquired from the switch device 40, the automated driving controller 270 starts automated travel in cooperation with the travel control actuator group 62.

The automated parking function section 273 achieves automated parking of a vehicle as an automated driving technique different from the automated travel described above. The automated parking function section 273 recognizes a parking space based on detected object information acquired from the peripheral monitoring sensor group 61 and moves the vehicle to the parking space recognized in cooperation with the travel control actuator group 62. The automated parking function section 273 includes a PA (Parking Assist) function and an AVP (Auto Valet Parking) function as control functions of automated parking for assisting or performing parking of the vehicle instead of a driver. The PA function performs manned automated parking after a driver sets a parking space while the driver is in a vehicle. The AVP function performs unmanned automated parking after a driver gets out of a vehicle. In the unmanned automated parking, the automated driving system 60 searches for a parking space and then moves the vehicle to the parking space searched.

The automated driving controller 270 can wirelessly communicate with a remote controller 50. The remote controller 50 is a compact device that a driver can carry. The remote controller 50 includes a transmitter 51 and a start switch 52. When the start switch 52 of the remote controller 50 is operated, the transmitter 51 transmits an operation instructing signal for instructing the AVP function to start its operation to the automated driving controller 270. When the AVP function is activated and is in a ready state, the automated parking function section 273 starts unmanned automated parking based on the operation instructing signal received from the remote controller 50. Specifically, the remote controller 50 is a mobile device for a smart entry system or a mobile terminal such as a smartphone registered in the automated driving controller 270. The start switch 52 is not limited to a physical press button and may be an icon on a display, for example.

Next, the shift selector device 210 used for the automated driving system 60 of the second embodiment described above will be described in detail.

In a position setting mechanism 212 of the shift selector device 210, automated travel functions at automated levels 2 to 4 are respectively linked to the activation positions 18 as a plurality of control functions. The activation line 28 in the position setting mechanism 212 branches from the shift line 27 at the D range as in the first embodiment. The automated travel function at level 2 is linked to the activation position 18 at a position on the activation line 28 that is the closest to the D range. The automated travel function at level 4 is linked to the activation position 18 at a position on the activation line 28 that is the furthest from the D range. Consequently, a Lv2 range, a Lv3 range, and a Lv4 range are arranged on the activation line 28 in this order from a D range side.

A parking assist position 16 is disposed on a side of each of the N and P ranges in the position setting mechanism 212. A PA range is set at a position adjacent to the N range, to which the selector lever 11 can directly move from the N range. The PA range is the parking assist position 16 linked to the PA function. By selecting the PA range, a driver can activate the PA function. An AVP range is set at a position adjacent to the P range, to which the selector lever 11 can directly move from the P range. The AVP range is the parking assist position 16 linked to the AVP function. By selecting the AVP range, a driver can activate the AVP function.

The lock mechanism 14 is disposed not only between the activation positions 18 on the activation line 28 but also between the shift line 27 and each parking assist position 16. When the PA function and the AVP function are not available in the automated driving system 60, based on control of the selector controller 13, the lock mechanism 14 restricts displacement of the selector lever 11 to the parking assist position 16 corresponding to each control function.

The selector controller 13 detects a position selected by the selector lever 11 among the shift position 17, the activation position 18, and the parking assist position 16, each of which is set in plural. When the parking assist position 16 is selected similarly to the activation position 18, the selector controller 13 outputs an activation instructing signal for instructing the PA function or the AVP function corresponding to the parking assist position 16 selected to be activated to the automated driving controller 270.

In addition, when an upper control function of achieving high-level automated travel is not available based on a function state signal acquired from the automated driving controller 270, the selector controller 13 reduces the movable range of the selector lever 11 by the lock mechanism 14. For example, when detected object information necessary for automated travel at automated level 3 cannot be acquired due to a failure of a sensor unit or the like, the selector controller 13 prohibits the movement of the selector lever 11 from the Lv2 range to the Lv3 range by the lock mechanism 14. When the PA function or the AVP function is not available based on the function state signal, the selector controller 13 prohibits the movement of the selector lever 11 to the parking assist position 16 corresponding to an unavailable automated parking function by the lock mechanism 14.

Similarly to the first embodiment, when an operating upper control function stops or is going to stop based on the function state signal, the selector controller 13 controls the actuator mechanism 15 to move the selector lever 11 to a lower activation position 18. For example, when automated travel at automated level 3 is difficult to continue due to a failure of the sensor unit or the like, the actuator mechanism 15 performs shift-down from the Lv3 range to the Lv2 range. The movement of the selector lever 11 from the Lv2 range to the Lv3 range is prohibited by the lock mechanism 14. Similarly, according to the stoppage of the PA function or the AVP function, the selector controller 13 can move the selector lever 11 from each parking assist position 16 to the P range or the N range by control of the actuator mechanism 15.

Next, a method of activating and operating control functions of automated travel in the automated driving system 60 by inputting a shift operation to the shift selector device 210 described above will be described in detail with reference to a state transition diagram of FIG. 4 as well as FIG. 3.

When the selector lever 11 is moved from the D range to the Lv2 range and the Lv2 range is selected, an automated travel function at automated level 2 (hereinafter, "level 2 function") is activated to be in a ready state. In this case, a vehicle continues to travel in a manual driving mode. When the level 2 function becomes in a ready state and then an operation is input to the set switch 41 on the steering wheel 30, the level 2 function becomes in an operating state. Automated travel is thus performed using the level 2 function corresponding to the ACC+LKA function.

When an operation is input again to the set switch 41 during the level 2 function, the level 2 function stops its operation and returns to be in a ready state. Similarly, when a predetermined condition for transition to a ready state is satisfied, the level 2 function also suspends its operation and returns to be in a ready state. Examples of the condition for transition to the ready state of the level 2 function state include a case where the travel environment is degraded by fog and rain. The manual driving by a driver starts again in the cases described above.

In addition, when a shift operation from the Lv2 range to the D range is performed, the level 2 function stops. Similarly, when a condition for transition from the Lv2 range to the D range is satisfied, the level 2 function also stops and the selector lever 11 is moved to the D range. Examples of the condition for transition from the Lv2 range to the D range include a case where a failure that makes it impossible to continue automated travel at automated level 2 occurs in the automated driving system 60. The manual driving by the driver also starts again in this case.

When the selector lever 11 is moved from the Lv2 range to the Lv3 range and the Lv3 range is selected, an automated travel function at automated level 3 (hereinafter, "level 3 function") is activated to be in a ready state. When the level 2 function is already in an operating state during such a shift operation, the level 3 function is in a ready state while automated travel using the level 2 function continues. On the other hand, when the Lv3 range is selected while the level 2 function is in a ready state, the manual driving mode continues and the level 3 function is in a ready state. When an operation is input to the set switch 41, the level 3 function becomes in an operating state.

When an operation is input again to the set switch 41 during automated travel using the level 3 function, the level 3 function cancels its operation and returns to be in a ready state. Similarly, when a condition for transition to the ready state of the level 3 function is satisfied, for example, when a small driving operation is input by the driver, the level 3 function also suspends its operation and returns to be in a ready state. The manual driving by the driver thus starts again.

When a shift operation from the Lv3 range to the Lv2 range is performed, the level 3 function stops. In this case, when the level 3 function is in an operating state, the driving mode of the vehicle is switched to the automated traveling mode using the level 2 function. When a condition for transition from the Lv3 range to the Lv2 range is satisfied, the level 3 function stops and the selector lever 11 is moved to the Lv2 range. As an example, when the level 3 function is not available due to an abnormality of the automated driving system 60, the condition for transition from the Lv3 range to the Lv2 range is satisfied. When the level 3 function is in an operating state and the level 2 function is also in an operating state, the driving mode of the vehicle is switched to the automated traveling mode using the level 2 function.

When the selector lever 11 is moved from the Lv3 range to the Lv4 range and the Lv4 range is selected, an automated travel function at automated level 4 (hereinafter, "level 4 function") is activated. When the level 2 function or the level 3 function is already in an operating state during such a shift operation, the level 4 function is in a ready state while automated travel using each automated travel function continues. On the other hand, when the Lv4 range is selected while a lower automated travel function does not operate, the manual driving mode continues and the level 4 function is in a ready state. When an operation is input to the set switch 41, the level 4 function becomes in an operating state.

When an operation is input again to the set switch 41 during automated travel using the level 4 function, the level 4 function cancels its operation and returns to be in a ready state. Similarly, when a condition for transition to the ready state of the level 4 function is satisfied, for example, when a driving operation (an override operation) is input by the driver, the level 4 function also suspends its operation and returns to be in a ready state. The manual driving by the driver thus starts again.

When a shift operation from the Lv4 range to the Lv3 range or the Lv2 range is performed, the level 4 function stops. In this case, when the level 4 function is in an operating state, the driving mode of the vehicle is switched to the automated traveling mode using the level 3 function or the level 2 function. When a condition for transition from the Lv4 range to the Lv3 range or the Lv2 range is satisfied, the level 4 function stops and the selector lever 11 is moved. When the level 4 function is in an operating state and the level 3 function or the level 2 function is operable in the automated driving system 60, the driving mode of the vehicle is switched to the automated traveling mode using the level 3 function or the level 2 function.

Next, an operation method in a case of using the PA function and the AVP function will be described in detail with reference to state transition diagrams of FIGS. 5 and 6 as well as FIG. 3.

Figure 5:
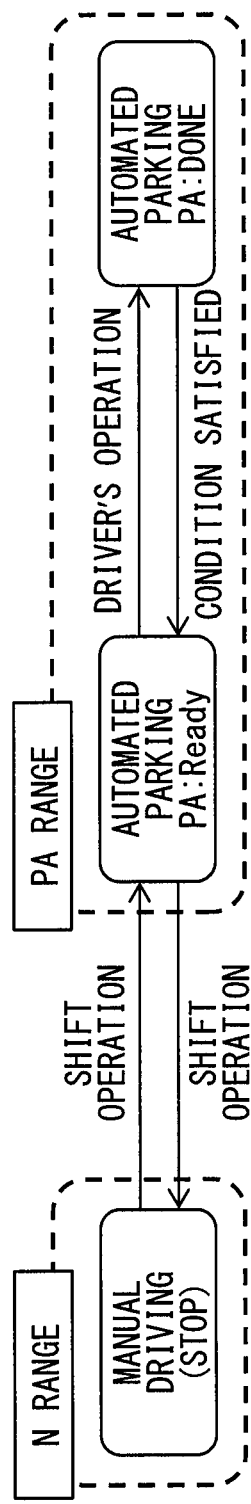
FIG. 5 is a state transition diagram illustrating a state transition of a PA function that achieves manned automated parking.

When manned automated parking illustrated in FIG. 5 is performed, a driver stops a vehicle near a parkable parking space in a parking lot, which is a destination, and then moves the selector lever 11 via the N range to the PA range. Since the PA range is disposed adjacent to the N range, the driver can smoothly perform a shift operation from the D range to the PA range and a shift operation from the R range to the PA range. When the PA range is selected by such a shift operation, the PA function is activated to be in a ready state.

The driver sets the nearby parking space by operating an operation system (for example, a touch panel) mounted on the vehicle. The PA function thus becomes in an operating state and moves the vehicle to the parking space designated by the driver. The vehicle automatically moves forward or backward to be accommodated in the parking space. When the vehicle stops in the parking space, in response to parking being completed, the PA function becomes in a ready state. The driver in the vehicle checks that parking is completed and then moves the selector lever 11 via the N range to the P range. In this way, manned automated parking of the vehicle is completed.

Figure 6:
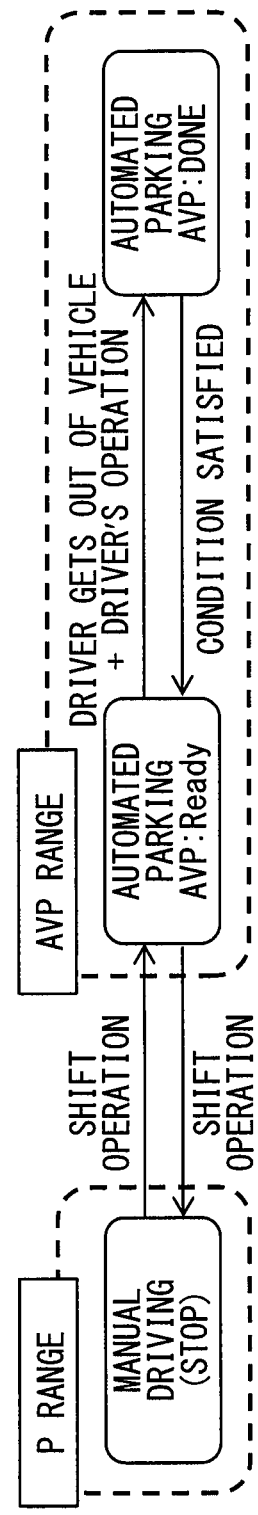
FIG. 6 is a state transition diagram illustrating a state transition of an AVP function that achieves unmanned automated parking.

When unmanned automated parking illustrated in FIG. 6 is performed, a driver reaches at a destination and then moves the selector lever 11 via the P range to the AVP range. When the AVP range is selected, the AVP function is activated to be in a ready state. The driver gets out of the vehicle while the AVP function is in a ready state.

The driver who has got out of the vehicle operates the start switch 52 of the remote controller 50 from outside the vehicle, so that the AVP function becomes in an operating state. The vehicle searches for a parking space and then is moved to the parking space by the AVP function. When the vehicle stops in the parking space searched, in response to parking being completed, the PA function becomes in a ready state.

When the driver operates the start switch 52 again to instruct the vehicle to start driving again, that is, when the vehicle is called, the AVP function is switched from a ready state to an operating state. The driver gets on the vehicle called and then moves the selector lever 11 via the P range to the D range or the R range. The driving mode of the vehicle is thus switched to a manual driving mode by the driver.

As in the second embodiment described above, control functions respectively linked to the activation positions 18 may be distinguished from each other by the automated level of automated driving. Such a second embodiment achieves similar effects as those of the first embodiment. When a driver performs a shift operation on the shift selector device 210, the functions of the automated driving system 60 can be activated. It is thus possible to eliminate an operation lever used only for switching automated levels.

As higher-level automated driving is possible as in the second embodiment, the operation system may be more complicated. In addition, when automated travel is possible at a plurality of automated levels and these automated level are switched, it becomes more difficult to check which of the control functions operates. Consequently, the shift selector device 10 that can clearly indicate a control function being selected by the position of the selector lever 11 in addition to or instead of a display and that can switch automated levels of automated travel by a shift operation is particularly suitable for a vehicle including a high-level automated travel function.

Third Embodiment

Figure 7:
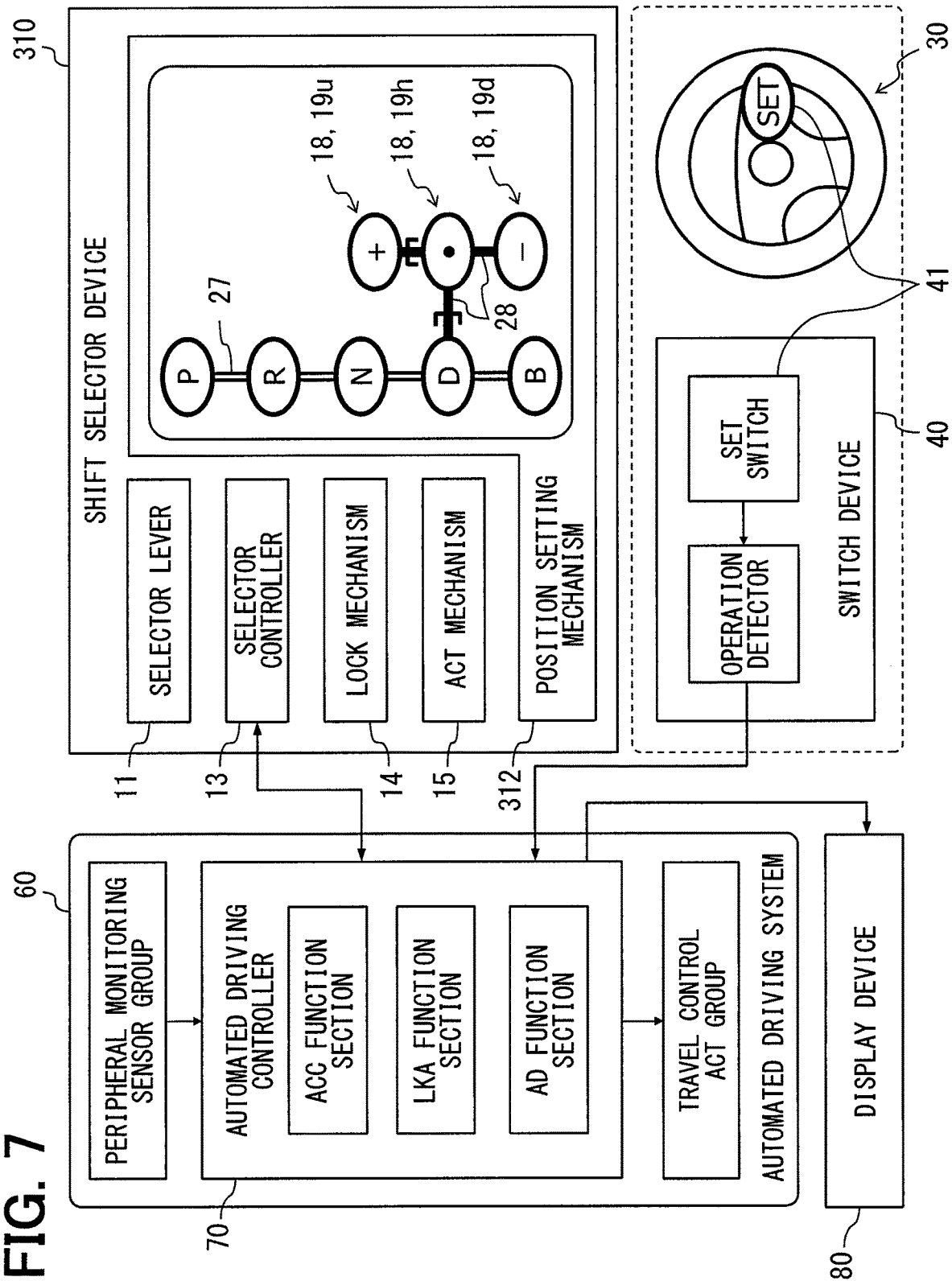
FIG. 7 is a block diagram illustrating an electrical configuration of a shift selector device, a switch device, and an automated driving system according to a third embodiment.
Figure 8:
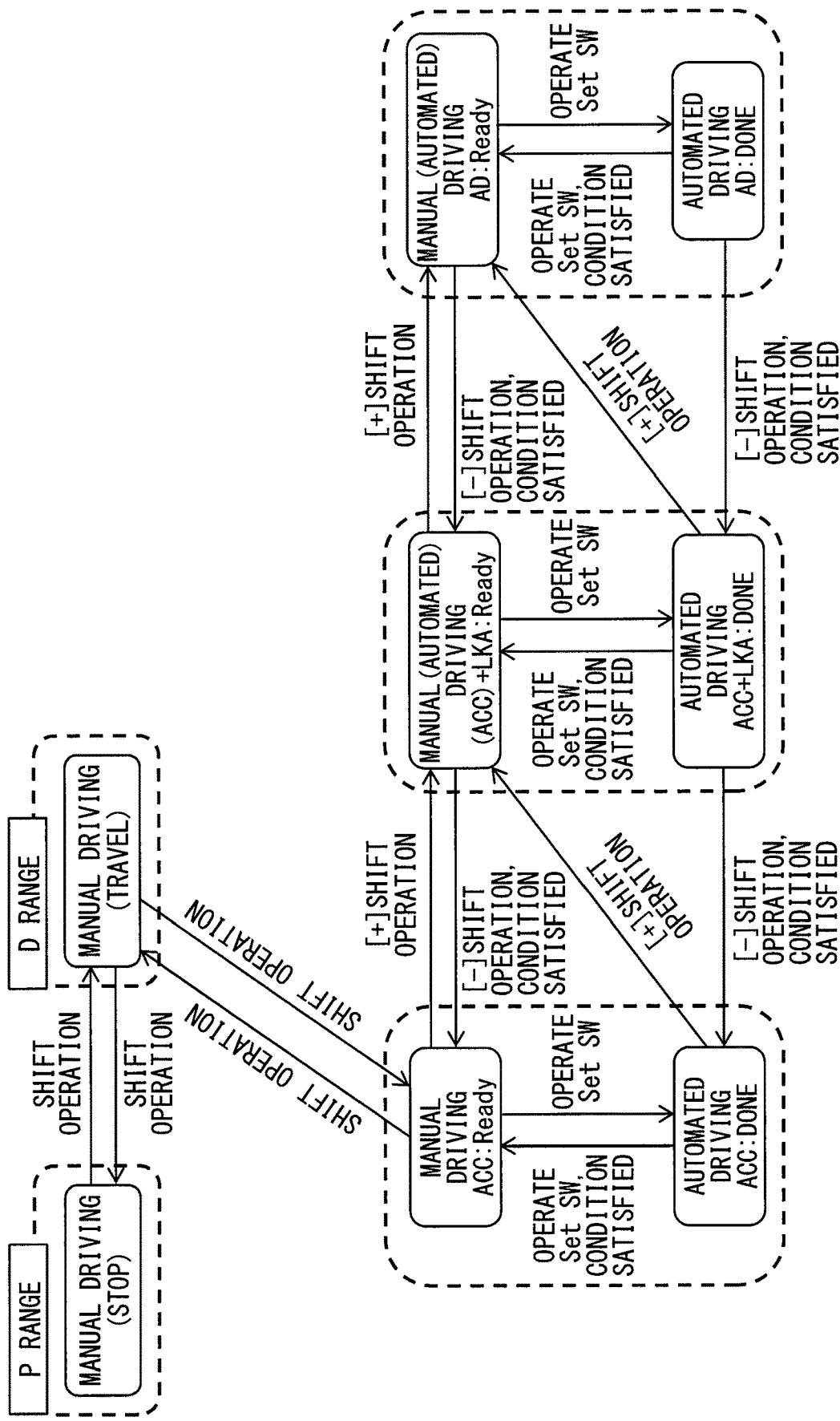
FIG. 8 is a state transition diagram illustrating a state transition of a control function according to the third embodiment.

A third embodiment of the present disclosure illustrated in FIGS. 7 and 8 is another modification of the first embodiment. In a shift selector device 310 according to the third embodiment, instead of the ACC range of the first embodiment (see FIG. 1) and the like, an upper switching position 19u, a home position 19h, and a lower switching position 19d are set in a movable range of a position setting mechanism 312.

The upper switching position 19u, the home position 19h, and the lower switching position 19d are arranged in this order adjacent to and along the shift line 27 in a vehicle longitudinal direction at equal intervals. The activation line 28 on which the positions 19u, 19h, and 19d are arranged is formed in a T-shape as a whole. The activation line 28 includes a portion from the D range to the home position 19h and a portion linearly extending from the upper switching position 19u through the home position 19h to the lower switching position 19d. The position setting mechanism 312 returns the selector lever 11 having been moved to the upper switching position 19u or the lower switching position 19d to the home position 19h without staying the selector lever 11 at the upper switching position 19u or the lower switching position 19d.

The lock mechanism 14 is disposed between the D range and the home position 19h and between the home position 19h and the upper switching position 19u. The lock mechanism 14 can restrict the movements of the selector lever 11 from the D range to the home position 19h and from the home position 19h to the upper switching position 19u.

The selector controller 13 detects the movement of the selector lever 11 from the D range to the home position 19h. The selector controller 13 also detects the temporary movement of the selector lever 11 to the position 19u or 19d, where the home position 19h is a starting point. When the selector controller 13 detects a shift operation of the selector lever 11 from the D range via the home position 19h to the upper switching position 19u, the selector controller 13 outputs an activation instructing signal for instructing the ACC function to be activated to the automated driving controller 70.

When the selector controller 13 detects a shift operation of the selector lever 11 from the home position 19h to the upper switching position 19u, the selector controller 13 outputs an activation instructing signal for instructing a control function that is one-level higher than an activating control function to be activated to the automated driving controller 70. On the other hand, when the selector controller 13 detects a shift operation of the selector lever 11 from the home position 19h to the lower switching position 19d, the selector controller 13 outputs an activation instructing signal for instructing the automated driving controller 70 to switch to a control function that is one-level lower than an activating control function to the automated driving controller 70. As described above, the upper switching position 19u functions as the activation position 18 in the third embodiment.

When a control function that is higher in level than the current control function is not available based on a function state signal, the selector controller 13 prohibits the movement of the selector lever 11 to the upper switching position 19u by the lock mechanism 14. Moreover, when all the control functions in the automated driving system 60 are not available, the selector controller 13 prohibits the movement of the selector lever 11 from the D range to the home position 19h by the lock mechanism 14.

When the operating ACC function stops or is going to stop based on the function state signal, the selector controller 13 controls the actuator mechanism 15 to move the selector lever 11 from the home position 19h to the D range. The movement of the selector lever 11 from the D range to the home position 19h is thus prohibited by the lock mechanism 14.

The automated driving controller 70 is electrically connected directly or indirectly to a display device 80. The display device 80 is, for example, a multi-monitor in a combination meter or a head-up display device. The display device 80 can acquire a function state signal or the like from the automated driving controller 70. The display device 80 notifies a driver of a control function that is currently unavailable in the automated driving system 60 by displaying such a control function. In addition, the display device 80 notifies the driver of a control function in an activated state or in an operating state by displaying such a control function.

Next, a method of activating and operating control functions of the automated driving system 60 by inputting a shift operation to the shift selector device 310 will be described in detail with reference to a state transition diagram of FIG. 8 as well as FIG. 7.

When the selector lever 11 is moved from the D range via the home position 19$h$ to the upper switching position 19$u$ and the upper switching position 19$u$ is temporarily selected, the ACC function is activated to be in a ready state. When the ACC function is in a ready state and then an operation is input to the set switch 41 of the switch device 40, the ACC function becomes in an operating state and performs automated driving on acceleration/deceleration control. The transition of the ACC function between a ready state and an operating state is substantially the same as in the first embodiment.

When a shift operation of returning the selector lever 11 from the home position 19$h$ to the D range is performed, the ACC function stops. In addition, when a condition for transition to the D range is satisfied, the ACC function stops and the selector lever 11 is returned to the D range by the actuator mechanism 15.

When a shift operation of moving the selector lever 11 to the upper switching position 19$u$ is input during the activation of the ACC function, the LKA function is activated to be in a ready state. When the ACC function is already in an operating state during such a shift operation, the LKA function is in a ready state while control by the ACC function continues. On the other hand, when the upper switching position 19$u$ is selected while the ACC function is in a ready state, a manual driving mode continues and the ACC+LKA function is in a ready state. When an operation is input to the set switch 41 on the steering wheel 30, the ACC+LKA function becomes in an operating state. The transition of the ACC+LKA function between a ready state and an operating state is substantially the same as in the first embodiment.

When a shift operation of moving the selector lever 11 to the lower switching position 19$d$ is input or when a condition for transition to the ACC function is satisfied during the activation of the ACC+LKA function, the LKA function stops. When the ACC+LKA function or the ACC function is already in an operating state before the LKA function stops, acceleration/deceleration control by the ACC function continues after the LKA function stops.

When a shift operation of moving the selector lever 11 to the upper switching position 19$u$ is input during the activation of the ACC+LKA function, the AD function is activated to be in a ready state. When the ACC+LKA function or the ACC function is already in an operating state during such a shift operation, the AD function is in a ready state while automated driving using these functions continues. On the other hand, when the AD function is activated while either the ACC+LKA function or the ACC function is not in an operating state, the AD function is in a ready state while the manual driving mode continues. When an operation is input to the set switch 41, the AD function becomes in an operating state. The transition of the AD function between a ready state and an operating state is substantially the same as in the first embodiment.

When a shift operation of moving the selector lever 11 to the lower switching position 19$d$ is input or when a condition for transition to the ACC+LKA function is satisfied during the activation of the AD function, the AD function stops. When the AD function is already in an operating state before the AD function stops, acceleration/deceleration control by the ACC+LKA function continues after the AD function stops.

As described in the third embodiment, the home position 19$h$, the upper switching position 19$u$, the lower switching position 19$d$, and the like may be disposed in the position setting mechanism 312 for the purpose of activating the control functions of the automated driving system 60. Such a third embodiment achieves similar effects as those of the first embodiment. When a driver performs a shift operation on the shift selector device 310, the functions of the automated driving system 60 can be activated.

In addition, when the upper switching position 19$u$ and the lower switching position 19$d$ are disposed in the position setting mechanism 312 as described in the third embodiment, a driver can select a plurality of control functions by performing a shift operation in two opposite directions from the home position 19$h$. It is thus possible to achieve the shift selector device 310 in which a driver is easy to understand a method of selecting control functions.

Fourth Embodiment

Figure 9:
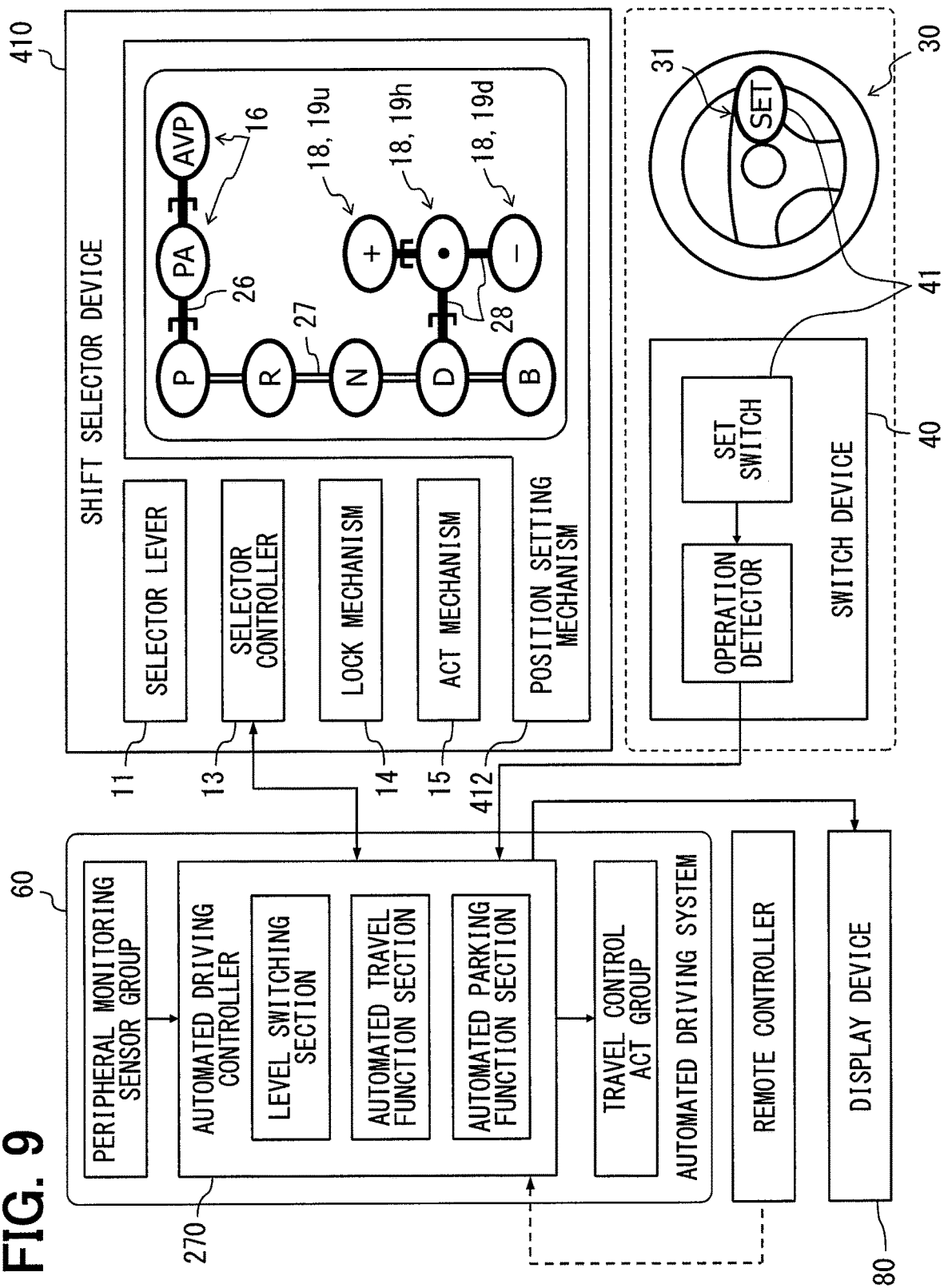
FIG. 9 is a block diagram illustrating an electrical configuration of a shift selector device, a switch device, and an automated driving system according to a fourth embodiment.
Figure 10:
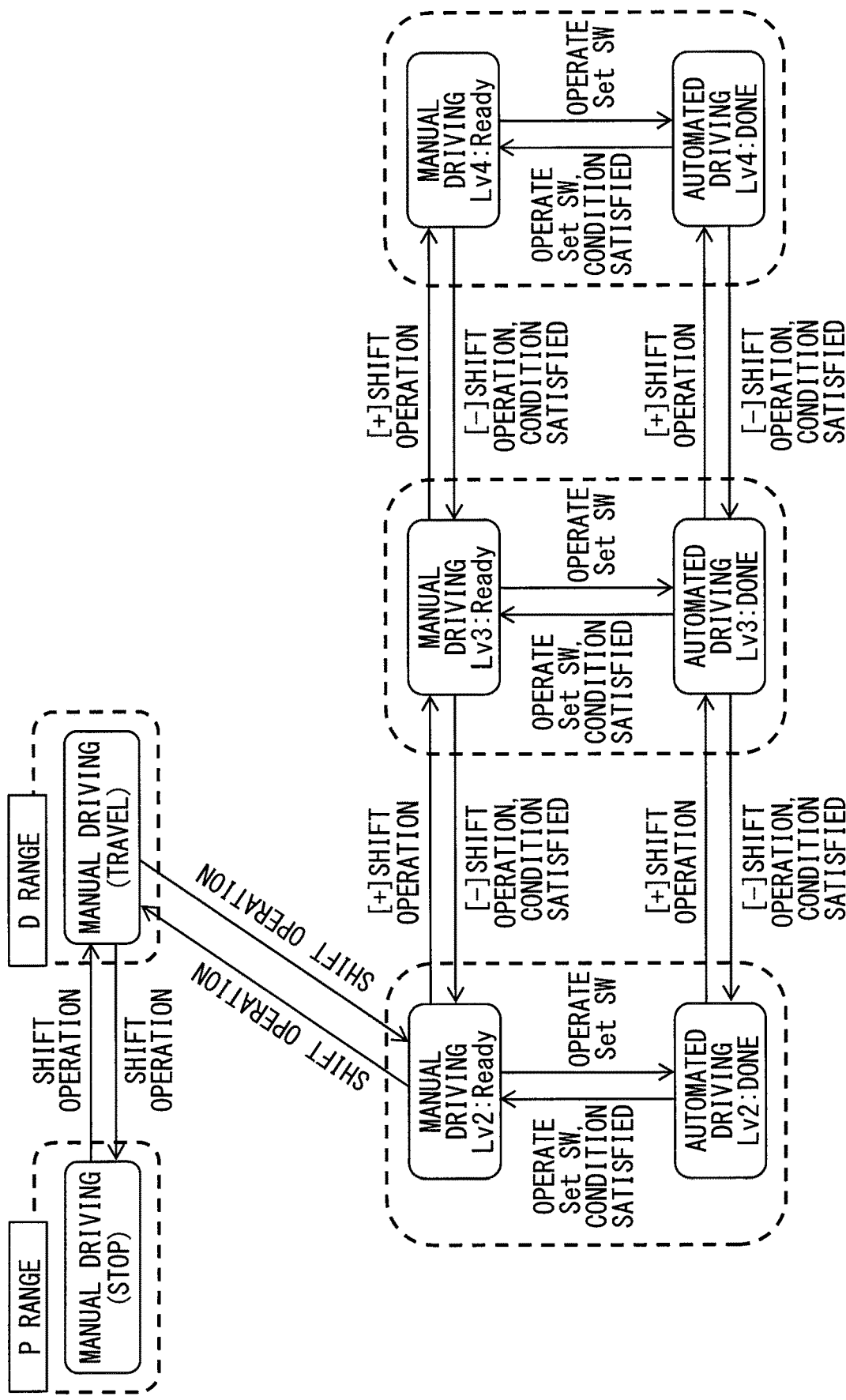
FIG. 10 is a state transition diagram illustrating a state transition of a control function according to the fourth embodiment.

A fourth embodiment of the present disclosure illustrated in FIGS. 9 and 10 is a modification of the second embodiment. The display device 80 is also connected to the automated driving controller 270 in the fourth embodiment. The display device 80 notifies a driver of an automated travel function and an automated parking function that are not available in the automated driving system 60 by displaying such functions. In addition, the display device 80 notifies the driver of an automated travel function or an automated parking function in an activated state or in an operating state by displaying such a function.

The upper switching position 19$u$, the home position 19$h$, and the lower switching position 19$d$ that are substantially the same as those of the third embodiment are set in a position setting mechanism 412 of a shift selector device 410 according to the fourth embodiment. A parking assist line 26 that extends the movable range of the selector lever 11 is formed in the position setting mechanism 412 in addition to the shift line 27 and the activation line 28. The parking assist line 26 branches from the P range. The PA range and the AVP range are arranged on the parking assist line 26 as the parking assist positions 16. The PA range is disposed at one of two parking assist positions 16 that is near the P range. The AVP range is disposed at the other of two parking assist positions 16 that is far away from the P range.

The lock mechanism 14 is disposed between the D range and the home position 19$h$, and between the home position 19$h$ and the upper switching position 19$u$, as in the third embodiment. The lock mechanism 14 is also disposed between the P range and the PA range, and between the PA range and the AVP range on the parking assist line 26. The lock mechanism 14 can restrict not only a shift operation of the selector lever 11 to the home position 19$h$ or the upper switching position 19*u* but also a shift operation of the selector lever 11 to each parking assist position 16.

Similarly to the second embodiment, when the parking assist position 16 is selected, the selector controller 13 outputs an activation instructing signal for instructing the PA function or the AVP function corresponding to the parking assist position 16 selected to be activated to the automated driving controller 270. In addition, when the selector controller 13 detects a shift operation of the selector lever 11 from the D range via the home position 19*h* to the upper switching position 19*u*, the selector controller 13 outputs an activation instructing signal for instructing the level 2 function to be activated to the automated driving controller 270.

When the selector controller 13 detects a shift operation of the selector lever 11 from the home position 19*h* to the upper switching position 19*u*, the selector controller 13 outputs an activation instructing signal for instructing an automated travel function that is one-level higher than an activating control function to be activated to the automated driving controller 270. When the selector controller 13 detects a shift operation of the selector lever 11 from the home position 19*h* to the lower switching position 19*d*, the selector controller 13 outputs an activation instructing signal for instructing the automated driving controller 270 to switch to an automated travel function that is one-level lower than an activating control function to the automated driving controller 270. As described above, the upper switching position 19*u* functions as the activation position 18 in the fourth embodiment. The activation instructing signal may be a signal for simply notifying the automated driver controller 270 of an input of a shift operation of the selector lever 11 to the upper switching position 19*u* or the lower switching position 19*d* as in the first embodiment.

Next, a method of activating and operating automated travel functions of the automated driving system 60 by inputting a shift operation to the shift selector device 410 will be described in detail with reference to a state transition diagram of FIG. 10 as well as FIG. 9. A method of activating and operating the PA function or the AVP function by selecting the PA range or the AVP range is substantially the same as that of the second embodiment.

When the selector lever 11 is moved from the D range via the home position 19*h* to the upper switching position 19*u* and the upper switching position 19*u* is temporarily selected, the level 2 function is activated to be in a ready state. When the level 2 function is in a ready state and then an operation is input to the set switch 41 of the switch device 40, the level 2 function becomes in an operating state and performs automated travel. The transition of the level 2 function between a ready state and an operating state is substantially the same as in the second embodiment.

When a shift operation of returning the selector lever 11 from the home position 19*h* to the D range is performed, the level 2 function stops. In addition, when a condition for transition to the D range is satisfied, the level 2 function stops and the selector lever 11 is returned to the D range by the actuator mechanism 15.

When a shift operation of moving the selector lever 11 to the upper switching position 19*u* is input during the activation of the level 2 function, the level 3 function is further activated. When the level 2 function is already in an operating state before the shift operation, the level 3 function is activated to be in an operating state and automated travel at automated level 3 is performed.

On the other hand, when the upper switching position 19*u* is selected while the level 2 function is in a ready state, a manual driving mode continues and the level 3 function is in a ready state. When an operation is input to the set switch 41 on the steering wheel 30, the level 3 function becomes in an operating state. The transition of the level 3 function between a ready state and an operating state is substantially the same as in the second embodiment.

When a shift operation of moving the selector lever 11 to the lower switching position 19*d* is input or when a condition for transition to the level 2 function is satisfied during the activation of the level 3 function, the level 3 function stops. When the level 3 function is in an operating state before the level 3 function stops, automated travel using the level 2 function continues after the level 3 function stops. On the other hand, when the level 3 function in a ready state stops, the level 2 function also becomes in a ready state and the manual driving mode continues.

When a shift operation of moving the selector lever 11 to the upper switching position 19*u* is input during the activation of the level 3 function, the level 4 function is activated. When the level 3 function or the level 2 function is already in an operating state during such a shift operation, the level 4 function is activated to be in an operating state and automated travel at automated level 4 is performed.

On the other hand, when the upper switching position 19*u* is selected while the level 3 function and the level 2 function are in a ready state, the manual driving mode continues and the level 4 function is in a ready state. When an operation is input to the set switch 41, the level 4 function becomes in an operating state. The transition of the level 4 function between a ready state and an operating state is substantially the same as in the second embodiment.

When a shift operation of moving the selector lever 11 to the lower switching position 19*d* is input or when a condition for transition to the level 3 function is satisfied during the activation of the level 4 function, the level 4 function stops. When the level 4 function is in an operating state before the level 4 function stops, automated travel using the level 3 function continues. On the other hand, when the level 4 function in a ready state stops, the level 3 function also becomes in a ready state and the manual driving mode continues.

The fourth embodiment described above achieves similar effects as those of the second embodiment. When a driver performs a shift operation on the shift selector device 410, the functions of the automated driving system 60 can be activated. In addition, when the PA range branches from the P range as described in the fourth embodiment, after parking using the PA function is completed, a driver can get out of a vehicle without performing a shift operation of the selector lever 11 to the P range.

Fifth Embodiment

Figure 11:
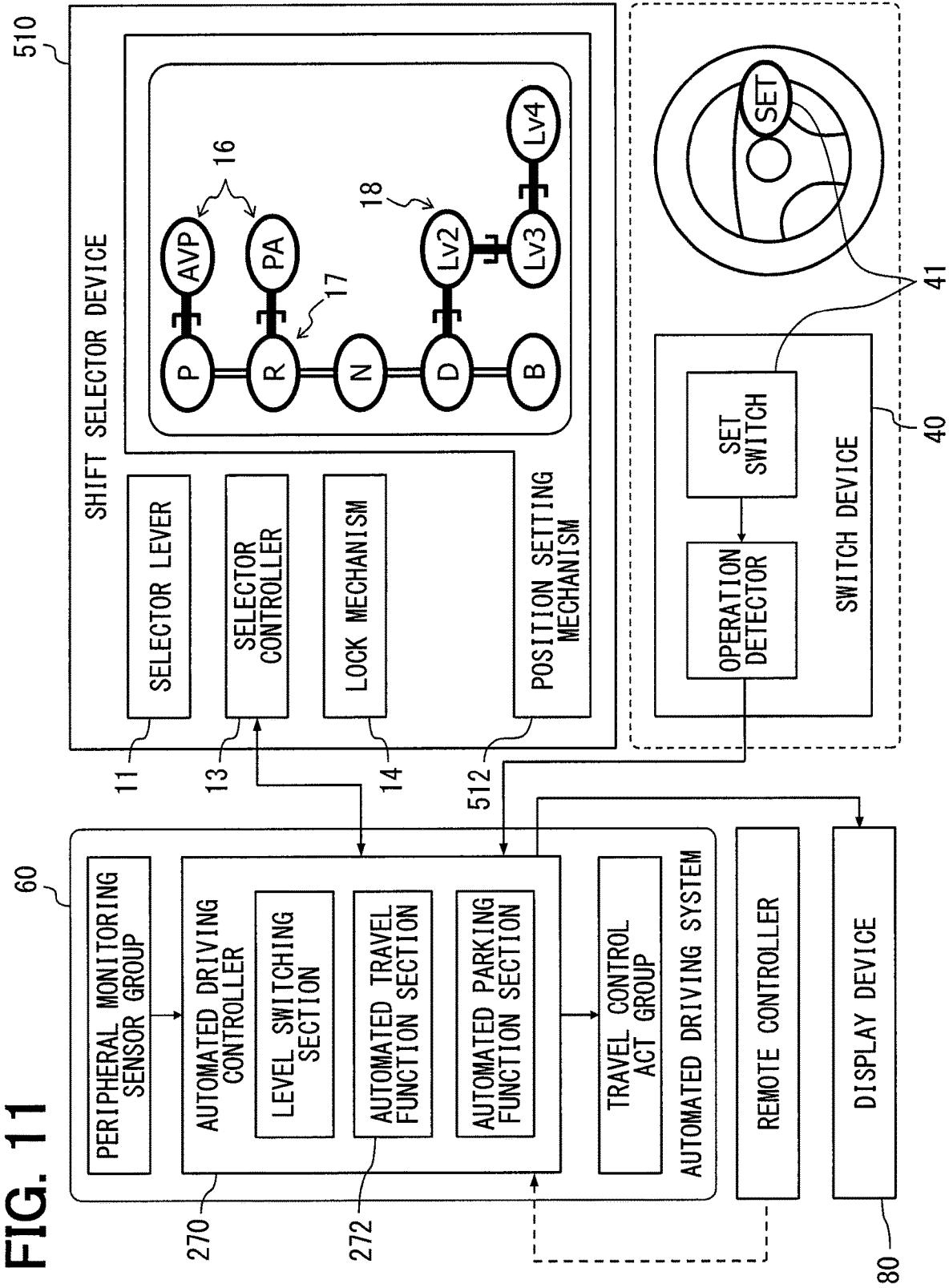
FIG. 11 is a block diagram illustrating an electrical configuration according to a fifth embodiment.

A fifth embodiment of the present disclosure illustrated in FIG. 11 is yet another modification of the second embodiment. A shift selector device 510 according to the fifth embodiment includes a position setting mechanism 512, the selector controller 13, the lock mechanism 14, and the selector lever 11 but does not include a configuration corresponding to the actuator mechanism 15 (see FIG. 3).

In the position setting mechanism 512, the PA range is disposed at a position adjacent to the R range of the shift positions 17, to which the selector lever 11 can directly move from the R range. A driver can perform a shift operation of the selector lever 11 from the R range to the PA range, thus activating the PA function.

Even if an operating automated travel function (control function) stops, the selector controller 13 does not execute control of moving the selector lever 11 to the activation position 18 corresponding to the D range or a low-level automated travel function. If the selector lever 11 stays at the activation position 18 where an unavailable automated travel function is selected, the automated travel function section 272 of the automated driving controller 270 does not accept an operation input to the set switch 41. With this control, the unavailable automated travel function is not activated or operated.

With the configuration described above, the display device 80 notifies a driver that an operating automated travel function is not available anymore by displaying such a message. In addition, when the set switch 41 is pressed in a state where an unavailable activation position 18 is selected, the display device 80 displays an error message indicating that the automated travel function being selected is currently unavailable.

In addition, when the operating automated travel function stops and then a driver performs a shift operation of moving the selector lever 11 to a lower side or a D range side, the selector controller 13 restricts a shift operation of the selector lever 11 to an upper side by the lock mechanism 14. Consequently, it is impossible to select again the activation position 18 corresponding to the unavailable automated travel function.

The fifth embodiment described above achieves similar effects as those of the second embodiment. As a driver performs a shift operation on the shift selector device 510, the functions of the automated driving system 60 can be activated. In addition, since the PA range branches from the R range, by selecting the PA range, a driver is aware that a function of assisting parking in reverse starts.

If it is configured so that an input to the set switch 41 is not accepted by the automated driving controller 70 as in the fifth embodiment, the actuator mechanism 15 (see FIG. 3) that moves the selector lever 11 may be omitted. Moreover, if an unavailable control function is indicated to a driver through the display device 80, the driver can recognize the unavailable control function.

Sixth Embodiment

Figure 12:
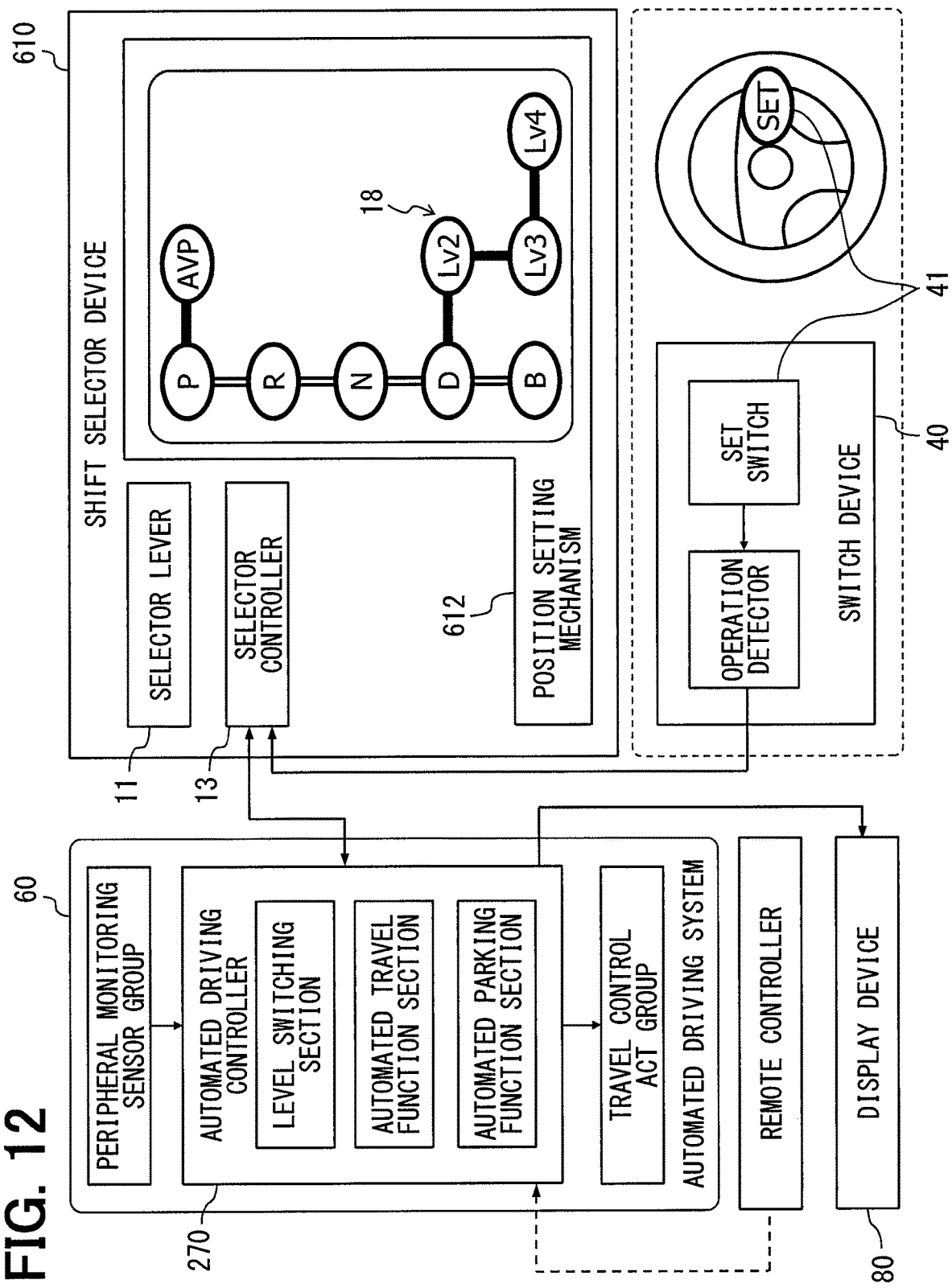
FIG. 12 is a block diagram illustrating an electrical configuration according to a sixth embodiment.

A sixth embodiment of the present disclosure illustrated in FIG. 12 is a modification of the fifth embodiment. A shift selector device 610 according to the sixth embodiment includes a position setting mechanism 612, the selector controller 13, and the selector lever 11 but does not include configurations corresponding to the lock mechanism 14 and the actuator mechanism 15 (see FIG. 3). The PA range (see FIG. 3) is also omitted from the position setting mechanism 612 of the sixth embodiment.

The selector controller 13 is connected to the switch device 40. An operation instructing signal based on an input of a press operation to the set switch 41 is input not to the automated driving controller 270 but to the selector controller 13. Based on a function state signal acquired from the automated driving controller 270, only when the activation position 18 linked to an available automated travel function is selected, the selector controller 13 transmits an input operation instructing signal to the automated driving controller 270.

Meanwhile, when the automated travel function corresponding to the activation position 18 selected by the selector lever 11 is not available, the selector controller 13 cancels transmission of the operation instructing signal. As a result, the system does not accept an input to the set switch 41. In this case, the display device 80 notifies a driver that an unavailable automated travel function is currently selected and is to be operated by mistake through a display on the display device 80.

The sixth embodiment described above achieves similar effects as those of the fifth embodiment. When a driver performs a shift operation on the shift selector device 610, the functions of the automated driving system 60 can be activated. Even if the lock mechanism 14 and the actuator mechanism 15 (see FIG. 3) are not provided as in the sixth embodiment, by blocking an operation instructing signal of an unavailable automated travel function using the selector controller 13, the wrong operation instructing signal is not input to the automated driving controller 270.

Seventh Embodiment

Figure 13:
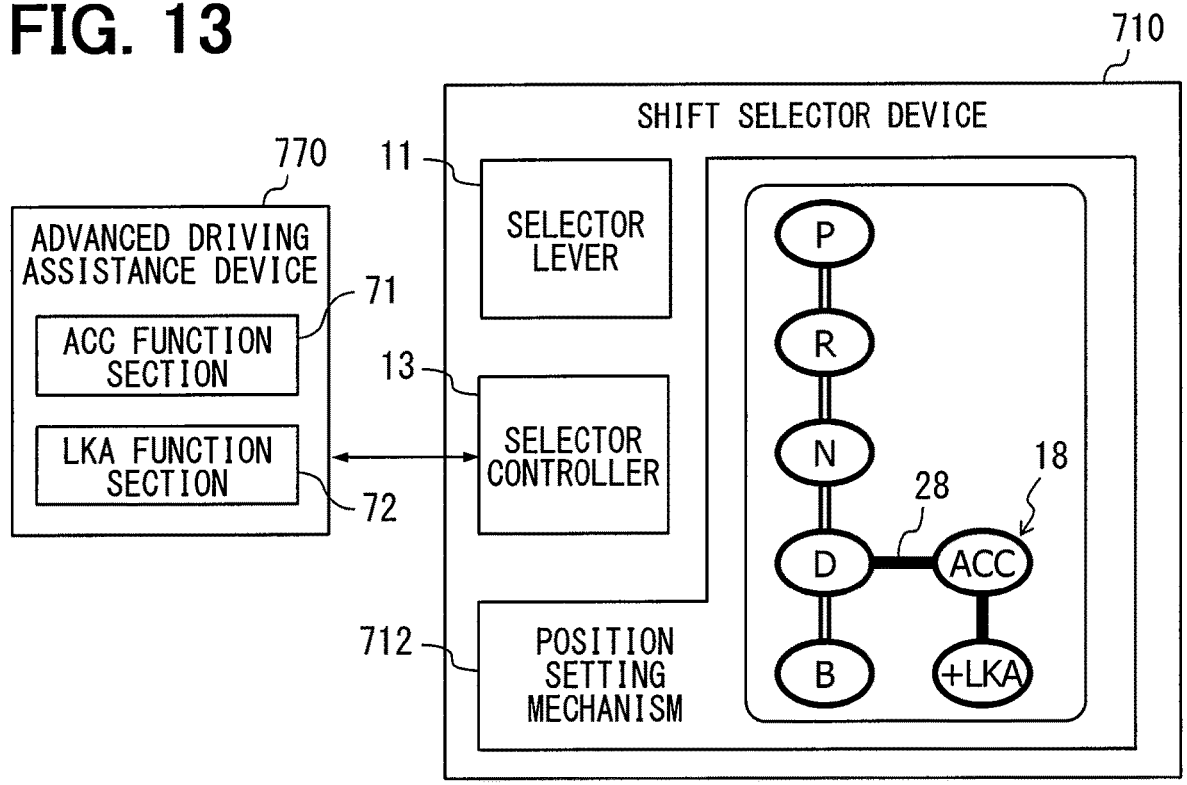
FIG. 13 is a block diagram illustrating an electrical configuration according to a seventh embodiment.

A seventh embodiment of the present disclosure illustrated in FIG. 13 is yet another modification of the first embodiment. A shift selector device 710 according to the seventh embodiment is used for an automated driving system mainly constituted by an advanced driving assistance device 770. The advanced driving assistance device 770 includes the ACC function section 71 and the LKA function section 72 that are substantially the same as those of the first embodiment, and has the ACC function and the ACC+LKA function accordingly. On the other hand, the advanced driving assistance device 770 does not include the AD function.

The shift selector device 710 includes a position setting mechanism 712, the selector controller 13, and the selector lever 11. On the other hand, configurations corresponding to the lock mechanism 14 and the actuator mechanism 15 (see FIG. 1) are omitted from the shift selector device 710 as in the shift selector device 610 (see FIG. 12) according to the sixth embodiment.

The activation line 28 of the position setting mechanism 712 is formed in an L-shape in which the D range is a starting point. The ACC range and the +LKA range are disposed as the activation positions 18 in the position setting mechanism 712. On the other hand, since the advanced driving assistance device 770 does not include the AD function, the AD range (see FIG. 1) is omitted from the activation line 28.

According to the seventh embodiment described above, when a driver performs a shift operation on the shift selector device 710, the ACC function or the ACC+LKA function can be selected and activated.

Eighth Embodiment

Figure 14:
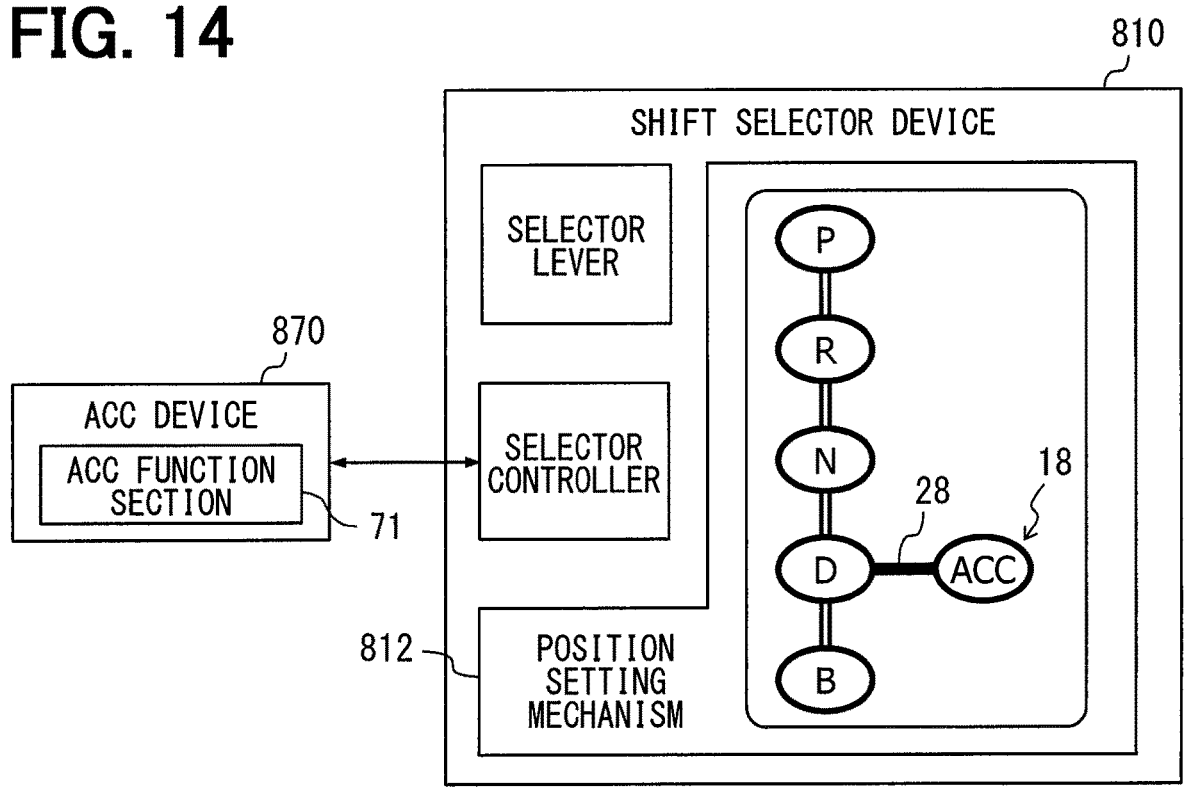
FIG. 14 is a block diagram illustrating an electrical configuration according to an eighth embodiment.

An eighth embodiment of the present disclosure illustrated in FIG. 14 is a modification of the seventh embodiment. A shift selector device 810 according to the eighth embodiment is used for an automated driving system mainly constituted by an ACC device 870. The ACC device 870 includes the ACC function section 71 that is substantially the same as that of the first embodiment, and has the ACC function accordingly. The ACC range for activating the ACC function is disposed as the activation position 18 in a position setting mechanism 812 of the shift selector device 810. The ACC range is disposed at an end of the activation line 28 that is linearly branched from the P range. According to the eighth embodiment described above, when a driver performs a shift operation on the shift selector device 810, the ACC function can be selected and activated.

Ninth Embodiment

Figure 15:
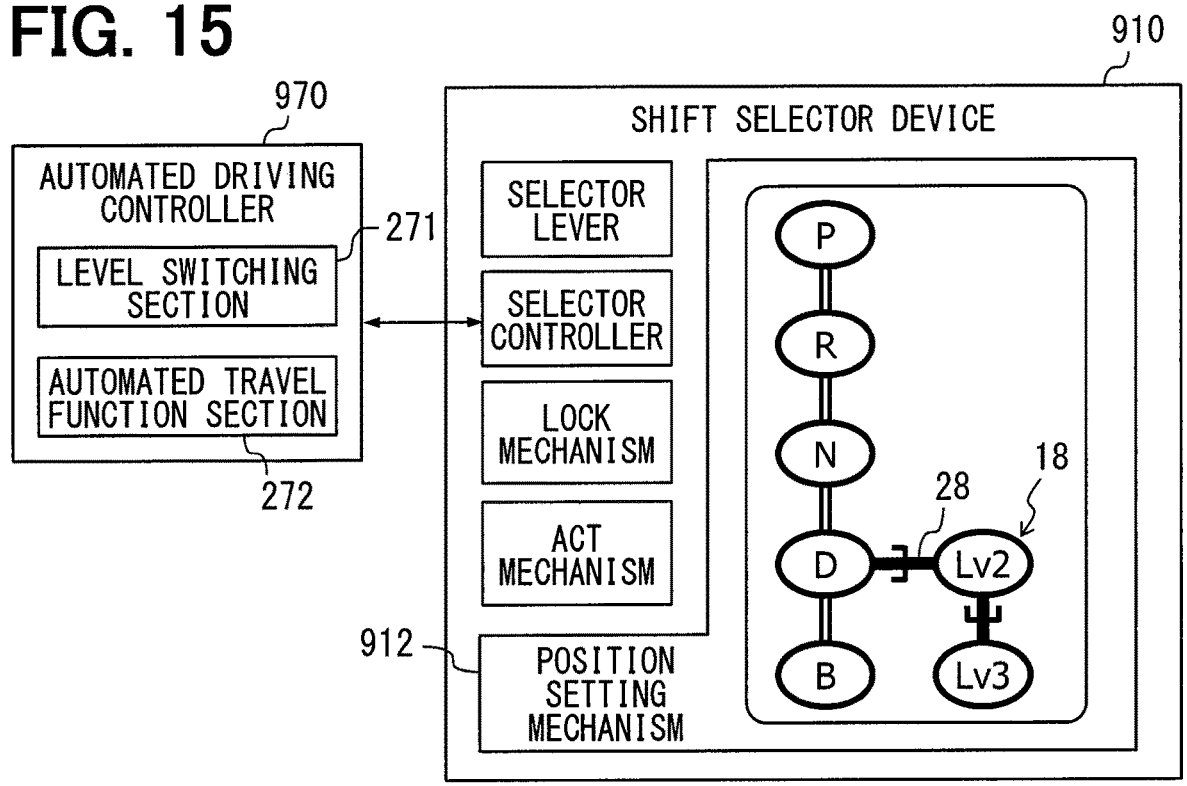
FIG. 15 is a block diagram illustrating an electrical configuration according to a ninth embodiment.

A ninth embodiment of the present disclosure illustrated in FIG. 15 is yet another modification of the second embodiment. A shift selector device 910 according to the ninth embodiment is used for an automated driving system mainly constituted by an automated driving controller 970. The automated driving controller 970 includes the level 2 function and the level 3 function as automated travel functions. The automated driving controller 970 controls the automated travel function section 272 to perform automated travel at automated level 2 or 3 selected by the level switching section 271. On the other hand, the automated travel function section 272 does not include an automated travel function at automated level 4. In addition, the automated parking function section 273 (see FIG. 3) is omitted from the automated driving controller 970.

Figure 3:
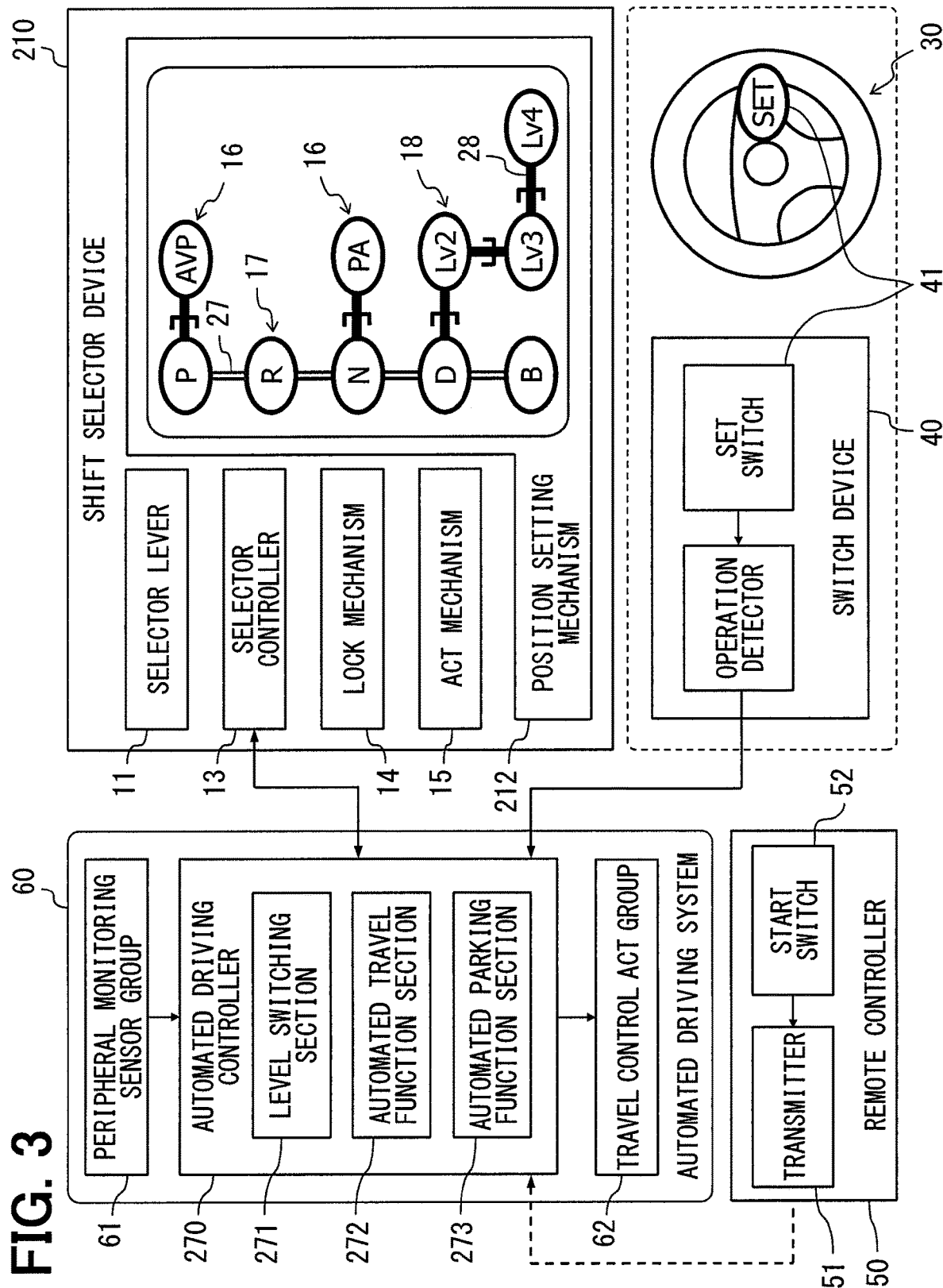
FIG. 3 is a block diagram illustrating an electrical configuration of a shift selector device, a switch device, and an automated driving system according to a second embodiment.
Figure 4:
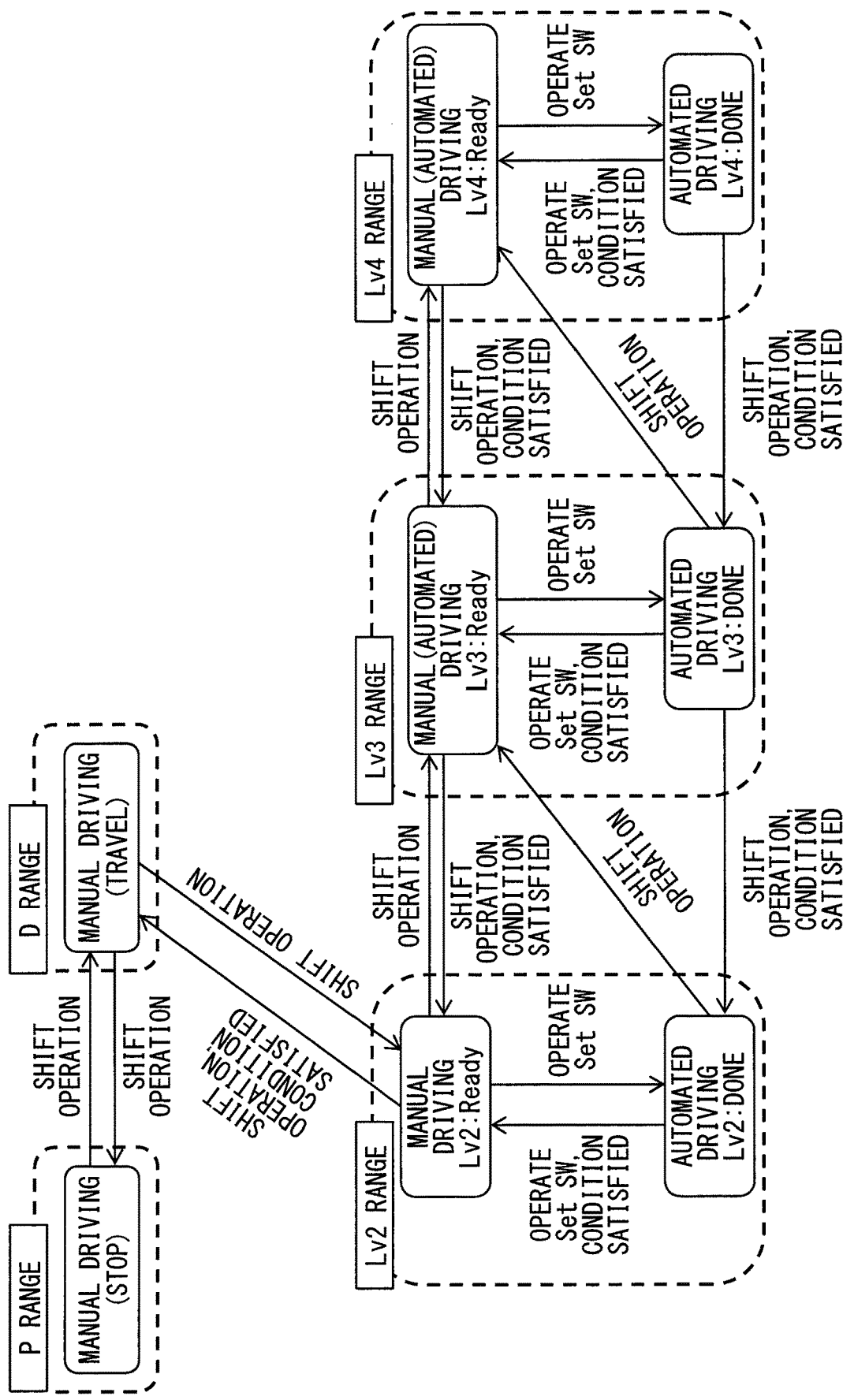
FIG. 4 is a state transition diagram illustrating a state transition of an automated travel function according to the second embodiment.

According to the function of the automated driving controller 970, the PA range, the AVP range, and the Lv4 range are omitted from a position setting mechanism 912 of the shift selector device 910 (see FIG. 3). The Lv2 range and the Lv3 range are disposed as the activation positions 18 on the activation line 28 of the position setting mechanism 912. According to the ninth embodiment described above, when a driver performs a shift operation on the shift selector device 910, an automated travel function can be selected and activated.

Tenth Embodiment

Figure 16:
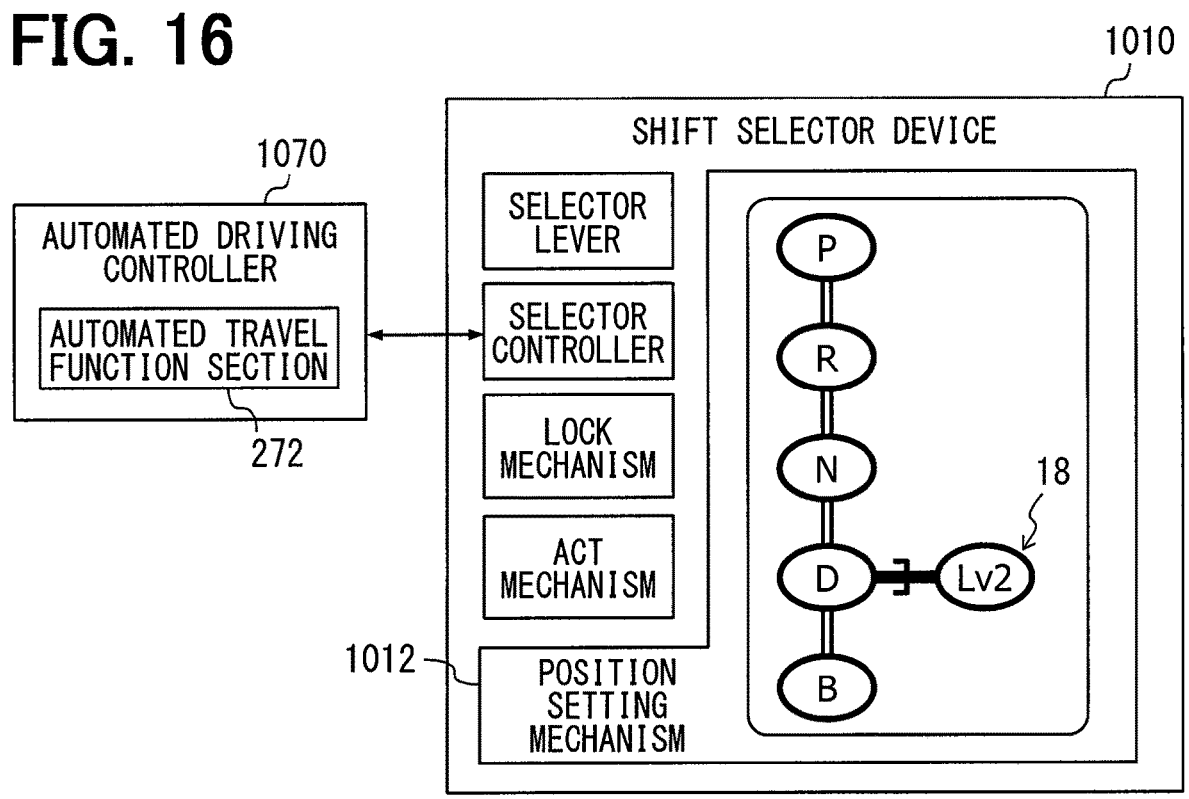
FIG. 16 is a block diagram illustrating an electrical configuration according to a tenth embodiment.

A tenth embodiment of the present disclosure illustrated in FIG. 16 is a modification of the ninth embodiment. A shift selector device 1010 according to the tenth embodiment is used for an automated driving system mainly constituted by an automated driving controller 1070. The automated travel function section 272 that achieves automated travel at automated level 2 is built in the automated driving controller 1070. According to the function of the automated driving controller 1070, only the Lv2 range is disposed as the activation position 18 in a position setting mechanism 1012. The Lv2 range is disposed adjacent to the D range, specifically, on a driver's side of the D range. According to the tenth embodiment described above, when a driver performs a shift operation on the shift selector device 1010, an automated travel function can be selected and activated.

Eleventh and Twelfth Embodiments

Figure 17:
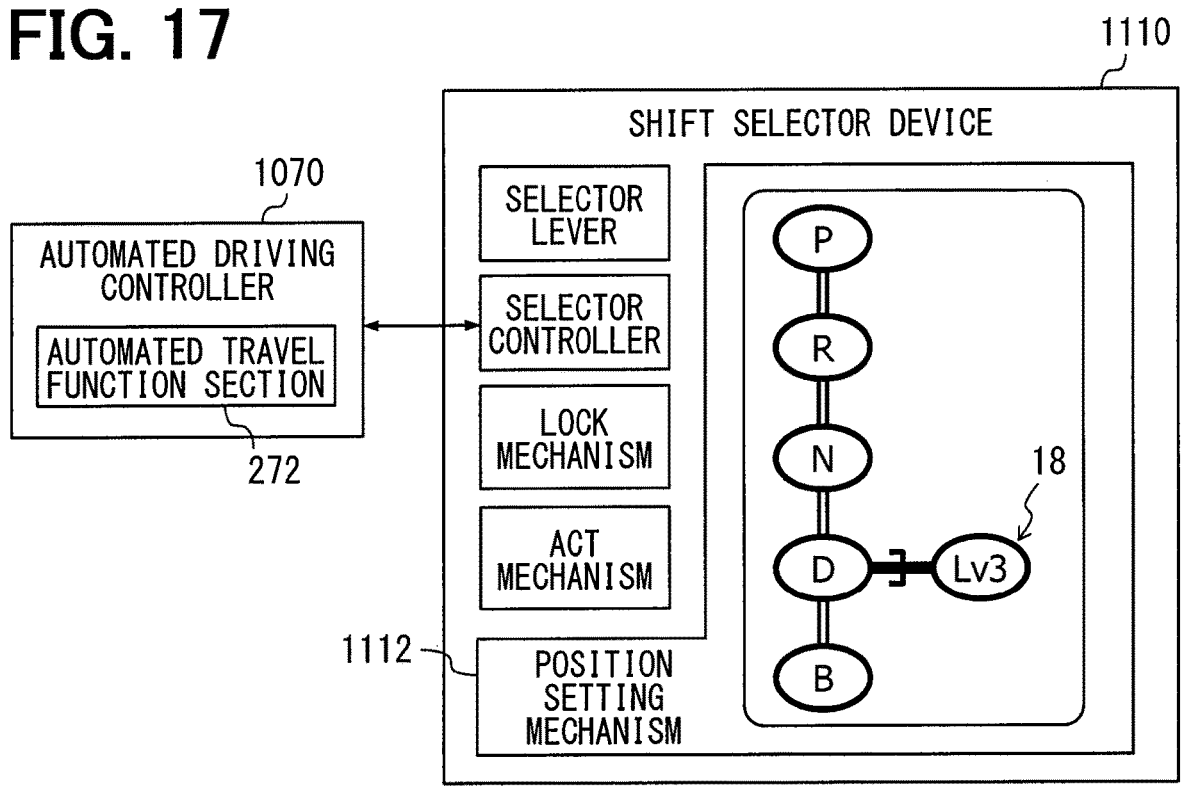
FIG. 17 is a block diagram illustrating an electrical configuration according to an eleventh embodiment.

An eleventh embodiment of the present disclosure illustrated in FIG. 17 is a modification of the tenth embodiment. The automated travel function section 272 of the automated driving controller 1070 achieves automated travel at automated level 3 in the eleventh embodiment. According to the function of the automated driving controller 1070, only the Lv3 range is disposed as the activation position 18 in a position setting mechanism 1112 of a shift selector device 1110. A driver can perform a shift operation to the Lv3 range to activate the level 3 function.

Figure 18:
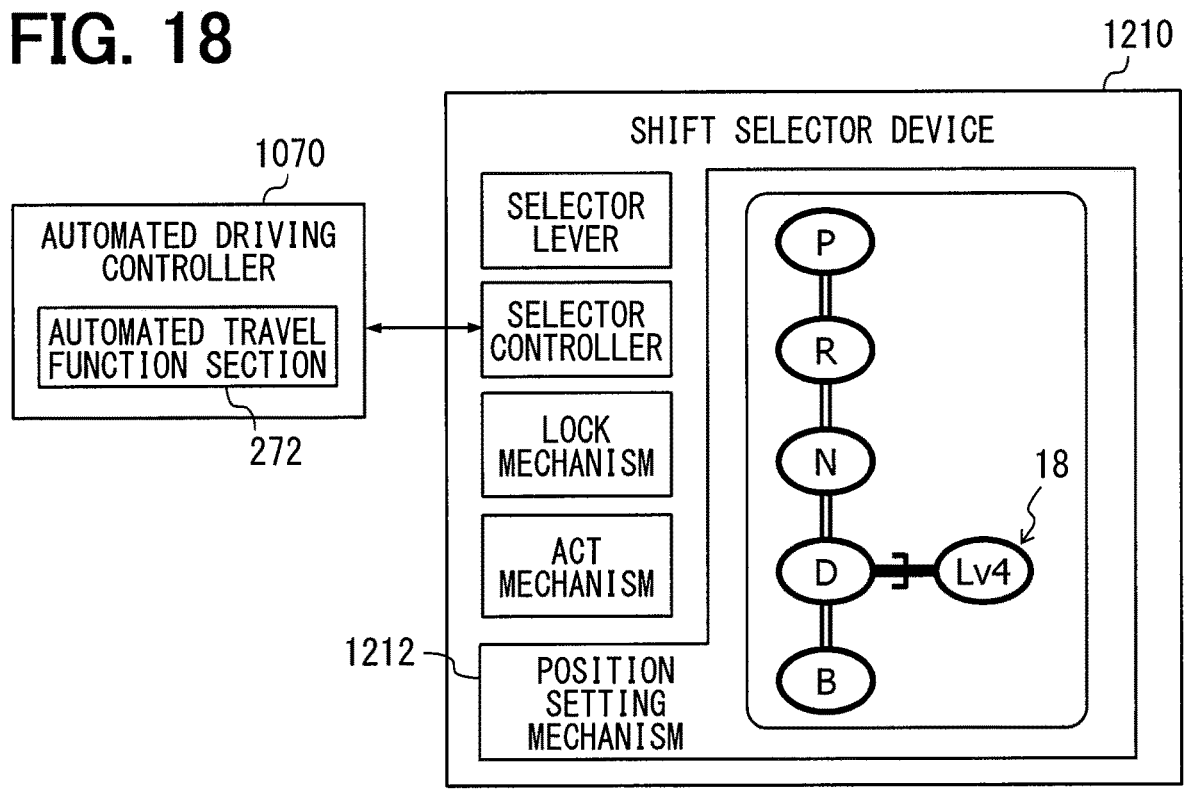
FIG. 18 is a block diagram illustrating an electrical configuration according to a twelfth embodiment.

A twelfth embodiment of the present disclosure illustrated in FIG. 18 is another modification of the tenth embodiment. The automated travel function section 272 of the automated driving controller 1070 achieves automated travel at automated level 4 in the twelfth embodiment. According to the function of the automated driving controller 1070, only the Lv4 range is disposed as the activation position 18 in a position setting mechanism 1212 of a shift selector device 1210. A driver can perform a shift operation to the Lv4 range to activate the level 4 function.

Thirteenth Embodiment

Figure 19:
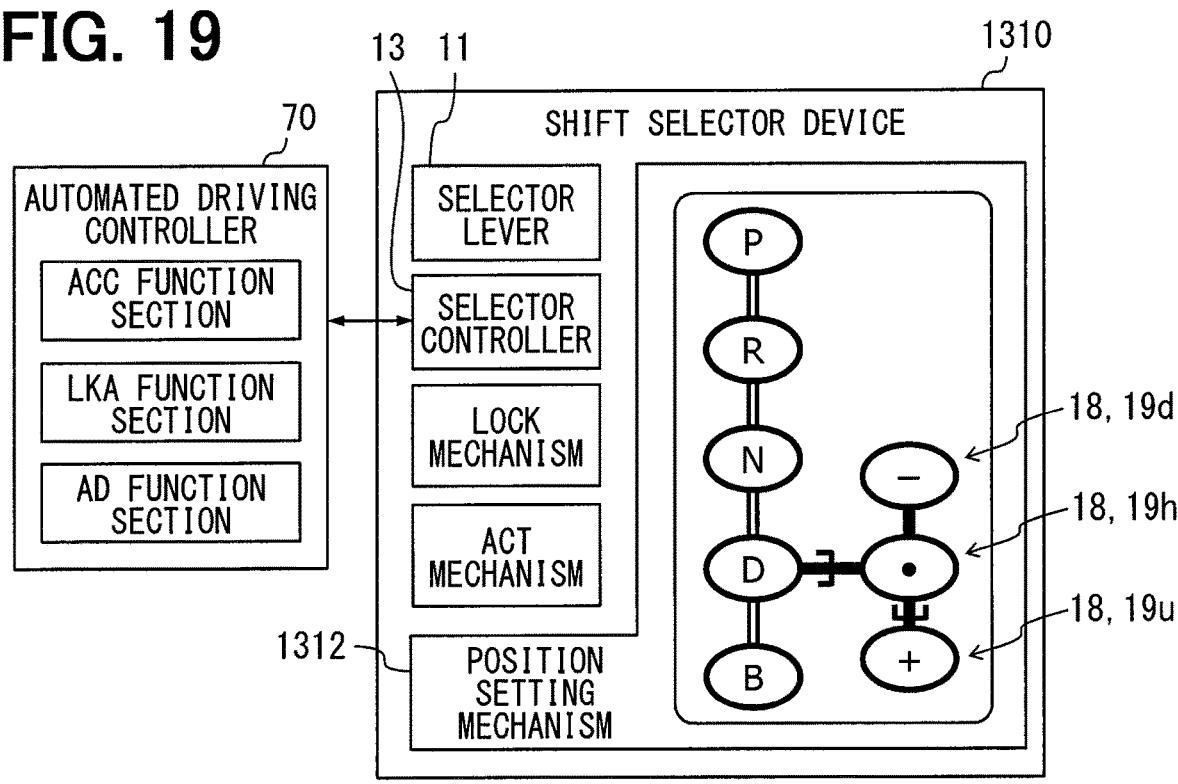
FIG. 19 is a block diagram illustrating an electrical configuration according to a thirteenth embodiment.

A thirteenth embodiment of the present disclosure illustrated in FIG. 19 is a modification of the third embodiment. When the selector controller 13 detects a movement of the selector lever 11 from the D range to the home position 19h in a shift selector device 1310 according to the thirteenth embodiment, the selector controller 13 outputs an activation instructing signal for instructing the ACC function to be activated to the automated driving controller 70. In the thirteenth embodiment, not only the upper switching position 19u but also the home position 19h functions as the activation position 18.

In a position setting mechanism 1312 of the shift selector device 1310, the arrangement of the upper switching position 19u and the lower switching position 19d with the home position 19h being interposed therebetween is opposite to that of the third embodiment. The upper switching position 19u is disposed rearward of a vehicle with respect to the home position 19h. The lower switching position 19d is disposed frontward of a vehicle with respect to the home position 19h. According to the thirteenth embodiment described above, when a driver performs a shift operation on the shift selector device 1310, an automated travel function can be selected and activated.

Other Embodiments

While the embodiments of the present disclosure have been described above, the present disclosure is not limited to the embodiments, and the present disclosure may be applied to various embodiments or various combinations of the embodiments without departing from the subject of the present disclosure.

The selector lever 11 that is formed in a bar shape and projects from a center console is "input member" in the embodiments described above. However, it is possible to appropriately change the shape and way of displacement of "input member" for inputting a shift operation. It is also possible to appropriately change the number and arrangement of positions including a shift position, an activation position, and a parking assist position that are disposed in a movable range of "input member".

For example, an automated travel function at a higher automated level is disposed at a position further away from a D range in the embodiments described above. However, an upper control function such as an automated travel function at automated level 4 may be set near the D range. A plurality of activation lines extending in a plurality of directions from a certain shift position such as a drive range, which is a starting position, may be set. For each type of activation positions, one or more activation positions may be disposed on the activation lines.

A certain shift position such as a P range does not need to be set in the movable range of a selector lever. In this case, a switch corresponding to the P range or the like is disposed on a shift knob or near the movable range. An activation position linked to the automated travel function at automated level 1 may be further disposed on the activation line.

As the embodiments described above include at least a shift selector device and a switch device, an activation operating system of selecting, activating, and operating a control function of an automated driving system is build. However, a configuration corresponding to the switch device may be integrated with the shift selector device. In this case, a set switch is disposed on a shift knob of a selector lever or near the movable range of the selector lever.

The control functions described in the embodiments are activated based on an activation instructing signal to be in a ready state and operated based on an operation instructing signal, thus starting to control a vehicle behavior. However, the control functions may be set to be activated based on an activation instructing signal and to start an operation of controlling the vehicle behavior. In this case, a configuration of a switch device including a set switch is unnecessary.

In the embodiments described above, when a lower control function already operates when the control function is switched to an upper control function, the upper control function is activated while automated travel using the lower control function continues. However, when the control function is switched to the upper control function based on a shift operation, the lower control function may be temporarily stopped and then a driving mode may be returned to a manual driving mode.

In the embodiments described above, functions related to automated driving including automated travel and automated parking may be implemented by hardware and software different from those of the automated driving system mainly constituted by the automated driving controller described above and the like or by a combination of such hardware and software.

Optional aspects of the present disclosure will be set forth in the following clauses.

According to an aspect of the present disclosure, a shift selector device is used for a vehicle including an automated travel system allowing automated travel of the vehicle instead of a driver. A selection operation of selecting a shift position is input to the shift selector device. The shift selector device includes an input member, a position setting mechanism and an activation controller.

The selection operation is input to the input member. The position setting mechanism defines a movable range of the input member while supporting the input member in a displaceable manner. A plurality of the shift positions and at least one activation position linked to the automated travel system are disposed in the movable range. When the activation position is selected by displacement of the input member, the activation controller outputs an activation instruction for instructing a control function of the automated travel system linked to the activation position to be activated.

According to the aspect of the present disclosure, when the activation position set in the position setting mechanism is selected, an activation instruction is output based on such a selection operation, so that the control function of the automated travel system can be activated. As described above, when the activation position is disposed in the movable range of the input member, a driver can perform a selection operation on the shift selector device to activate the control function of the automated travel system. It is thus possible to eliminate a configuration for activating the control function of the automated travel system such as an operation lever.

What is claimed is:

1. A shift selector device for a vehicle including an automated travel system allowing automated travel of the vehicle instead of a driver and to which a selection operation of selecting a shift position is input, the shift selector device comprising:
   an input member to which the selection operation is input;
   a position setting mechanism that defines a movable range of the input member while supporting the input member in a displaceable manner, where a plurality of the shift positions and at least one activation position linked to a control function of the automated travel system allowing the automated travel of the vehicle along a road are disposed in the movable range; and
   an activation controller that, when the activation position is selected by displacement of the input member, outputs an activation instruction for instructing the control function of the automated travel system linked to the activation position to be activated, wherein
   the automated travel system is capable of activating a plurality of the control functions,
   a plurality of the activation positions respectively linked to the control functions are disposed in the position setting mechanism,
   the control functions include an upper control function and a lower control function, and
   the upper control function is a control function in which more types of driving operations are control targets than in the lower control function or the driver is required to do less tasks during traveling than in the lower control function.

2. The shift selector device according to claim 1, wherein the position setting mechanism includes:
   an upper switching position for transition of the control function to be activated from the lower control function to the upper control function; and
   a lower switching position for transition of the control function to be activated from the upper control function to the lower control function.

3. The shift selector device according to claim 1, wherein:
   an activation line on which the activation positions are arranged and a shift line on which the shift positions are arranged are set in the position setting mechanism;
   the activation line branches from the shift line at a drive range that is one of the shift positions; and
   the activation position linked to the upper control function is disposed at a position further from the drive range than the activation position linked to the lower control function on the activation line.

4. The shift selector device according to claim 1, wherein the activation position branches from a drive range that is one of the shift positions in the movable range defined by the position setting mechanism.

5. A shift selector device for a vehicle including an automated travel system allowing automated travel of the vehicle instead of a driver and to which a selection operation of selecting a shift position is input, the shift selector device comprising:
   an input member to which the selection operation is input;
   a position setting mechanism that defines a movable range of the input member while supporting the input member in a displaceable manner, where a plurality of the shift positions and at least one activation position linked to a control function of the automated travel system allowing the automated travel of the vehicle along a road are disposed in the movable range;
   an activation controller that, when the activation position is selected by displacement of the input member, outputs an activation instruction for instructing the control function of the automated travel system linked to the activation position to be activated; and
   a restriction unit that, when the control function that is not available in the automated travel system is present, restricts displacement of the input member to the activation position linked to the control function.

6. A shift selector device for a vehicle including an automated travel system allowing automated travel of the vehicle instead of a driver and to which a selection operation of selecting a shift position is input, the shift selector device comprising:
   an input member to which the selection operation is input;

a position setting mechanism that defines a movable range of the input member while supporting the input member in a displaceable manner, where a plurality of the shift positions and at least one activation position linked to a control function of the automated travel system allowing the automated travel of the vehicle along a road are disposed in the movable range;

an activation controller that, when the activation position is selected by displacement of the input member, outputs an activation instruction for instructing the control function of the automated travel system linked to the activation position to be activated; and an actuator mechanism that, when the control function that is activated in the automated travel system stops or is going to stop, moves the input member from the activation position linked to the control function to one of another activation position and the shift position.

7. The shift selector device according to claim 1, wherein:

a switch device is disposed at a position of the vehicle that is different from a position of the input member; and the automated travel system starts an operation of the control function activated by selecting the activation position based on an operation input to the switch device.

8. A shift selector device for a vehicle including an automated travel system allowing automated travel of the vehicle instead of a driver and to which a selection operation of selecting a shift position is input, the shift selector device comprising:

an input member to which the selection operation is input;

a position setting mechanism that defines a movable range of the input member while supporting the input member in a displaceable manner, where a plurality of the shift positions and at least one activation position linked to a control function of the automated travel system allowing the automated travel of the vehicle along a road are disposed in the movable range; and an activation controller that when the activation position is selected b displacement of the input member, outputs an activation instruction for instructing the control function of the automated travel system linked to the activation position to be activated, wherein a switch device is disposed at a position of the vehicle that is different from a position of the input member, the automated travel system starts an operation of the control function activated by selecting the activation position based on an operation input to the switch device, and the automated travel system does not operate the control function when the control function linked to the activation position being selected is unavailable, even when an operation is input to the switch device.

* * * * *